US007158569B1

(12) United States Patent
Penner

(10) Patent No.: US 7,158,569 B1
(45) Date of Patent: Jan. 2, 2007

(54) METHODS OF DIGITAL FILTERING AND MULTI-DIMENSIONAL DATA COMPRESSION USING THE FAREY QUADRATURE AND ARITHMETIC, FAN, AND MODULAR WAVELETS

(76) Inventor: Robert C. Penner, 528 Fifth St., Manhattan Beach, CA (US) 90266

( * ) Notice: Subject to any disclaimer, the term of this patent is extended or adjusted under 35 U.S.C. 154(b) by 0 days.

(21) Appl. No.: 09/869,640

(22) PCT Filed: Dec. 21, 1999

(86) PCT No.: PCT/US99/30584

§ 371 (c)(1),
(2), (4) Date: Jul. 2, 2001

(87) PCT Pub. No.: WO00/44104

PCT Pub. Date: Jul. 27, 2000

Related U.S. Application Data

(60) Provisional application No. 60/116,540, filed on Jan. 19, 1999.

(51) Int. Cl.
*H04B 1/66* (2006.01)
(52) U.S. Cl. .................................... 375/240
(58) Field of Classification Search ........... 375/240.18, 375/240.19, 240.22, 240.25, 240.02, 240; 708/403, 405
See application file for complete search history.

(56) References Cited

U.S. PATENT DOCUMENTS

| 4,717,962 | A | 1/1988 | Moore | 358/260 |
| 5,253,192 | A * | 10/1993 | Tufts | 708/403 |
| 6,473,013 | B1 * | 10/2002 | Velazquez et al. | 341/120 |
| 2002/0054610 | A1 * | 5/2002 | Reusens et al. | 370/480 |

OTHER PUBLICATIONS

"Universal Constructions in Telchmüller Theory" R.C. Penner, Advances in Mathematics, vol. 98, No. 2, pp. 143-215, Apr. 1993.
"The Decorated Teichmüller Space of Punctured Surfaces", R.C. Penner, Communications in Mathematical Physics 113, pp. 299-339, 1987.

* cited by examiner

*Primary Examiner*—Emmanuel Bayard
(74) *Attorney, Agent, or Firm*—Andrus, Sceales, Starke & Sawall, LLP

(57) ABSTRACT

Methods are presented for calculating the wavelet filters and their inverses which rely on a new method of sampling (UA, TA, A) either digital or analog data. These methods combine and extend to give novel procedures for non-reversible multi-dimensional data compression. For selected applications, this procedure improves achievable compression factors by an estimated one to three orders of magnitude and is well-suited to picture build-up or other iterative refinement. Combining these wavelet filters and their inverse with previous theoretical work furthermore provides novel methods for calculating Fourier and other transforms. In a preferred embodiment used to calculate the Fourier transform (1) and its inverse (34) applied to digital input date, the method replaces the fast Fourier transform and its inverse and provides improvements in achievable accuracy. The new sampling method is inherently multiscale, and the invention thereby obviates the usual Nyquist constraint on the meaningful bandwidth in terms of the number of samples. Finally, the invention provides novel and efficient analog-to-digital and digital-to-analog interface.

65 Claims, 10 Drawing Sheets

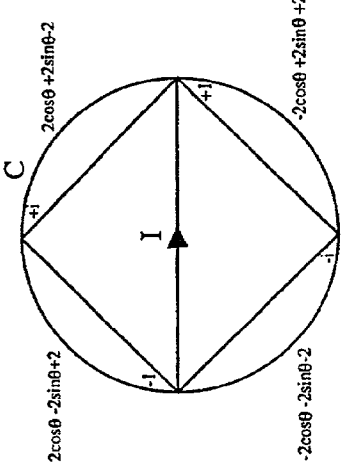
FIGURE 3a
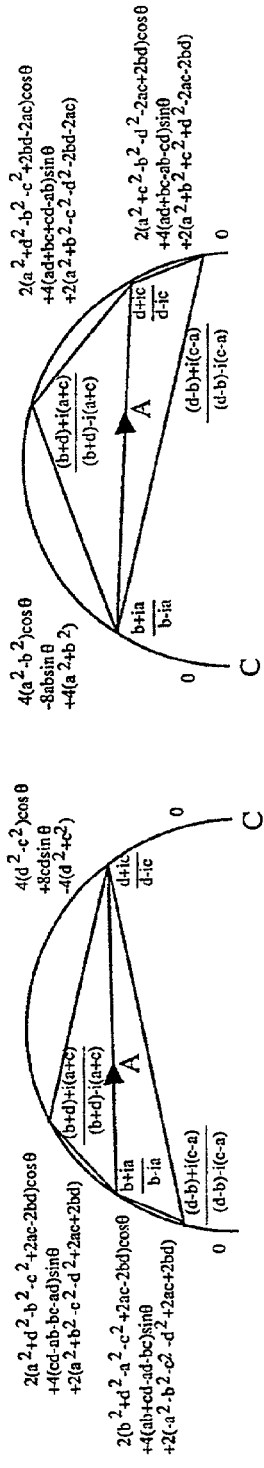
FIGURE 3b
FIGURE 3d
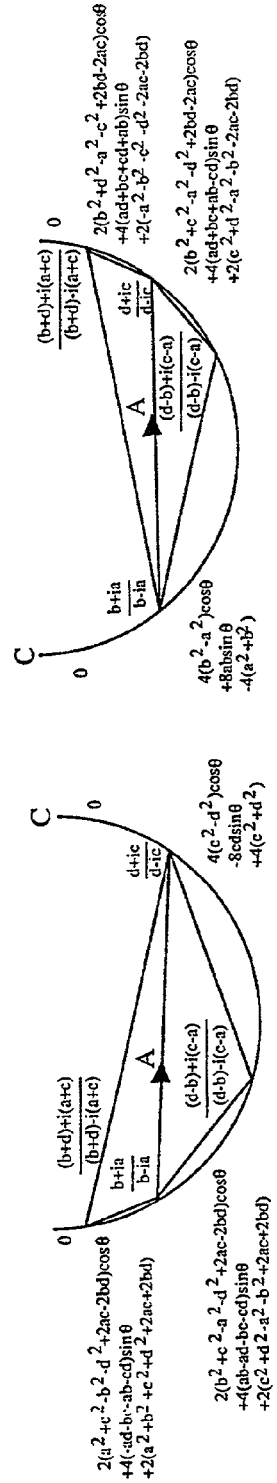
FIGURE 3c
FIGURE 3e

Routine: main

Data, Variables, and Effects:

input: data presented as a function f(p,q),
giving the function value at the
point (p-iq)/(p+iq)
output: array of complex Fourier coefficients
effect: calculates Fourier transform

```
Start
  │
  ▼
```

1. Normalize input:
a) Initialize array of complex fourier coefficients to zero
b) Compute abar, bbar, cbar so that $$\overline{f(p,q)} = f(p,q) - [abar* \frac{p^2-q^2}{p^2+q^2} + bbar* \frac{-2\,pq}{p^2+q^2} + cbar]$$

is zero for $(p,q)=(1,0)$, $(0,1)$, and $(1,1)$
Then: $\overline{f(p,q)}$ returns normalized values above 2. Start recursive calculation of arrows on top of
the circle with call to gener (Figure 6) with initial
values: arrow= doe, generation=1, envy=0, $\overline{f(-1,1)}$ 3. Start recursive calculation of arrows on bottom of
the circle with call to gener (Figure 6) with initial
values: arrow= doe, generation=1, envy=0, $\overline{f(1,1)}=0$ 4. Normalize output: divide Fourier coefficients by pi 5. Display computed coefficients and exit

FIGURE 5

Routine: main

Data, Variables, Effects:

input: array of complex Fourier coefficients
   $c$ for $|n| <= N$
output: array of three-tuples (p,q,z), where
   output function takes complex value
   z at (p-iq)/(p+iq) given in the counter-
   clockwise order on the circle
effect: calculates inverse Fourier transform

METHODS OF DIGITAL FILTERING AND MULTI-DIMENSIONAL DATA COMPRESSION USING THE FAREY QUADRATURE AND ARITHMETIC, FAN, AND MODULAR WAVELETS

CROSS-REFERENCE TO RELATED APPLICATION

The present invention is based on and claims priority to U.S. Provisional Patent Application Ser. No. 60/116,540 filed on Jan. 19, 1999 and is a national stage application of PCT International Application No. PCT/US99/30584 published on Jul. 27, 2000 as Publication No. WO 00/44104.

FIELD OF THE INVENTION

It is well-known that digital filtering of digitally represented samples of analog data can be simplified and improved by performing the required processing in some transformed domain. Using/both a transform and its inverse to simplify the digital or other manipulation of data, one first transforms the data from its initial form to an intermediate form, then applies a specified manipulation, and finally applies the inverse transform to recover the data in its initial form from its intermediate form. By way of example and not by way of limitation: the initial form of the data may be digital samples of analog data, and the intermediate form of the data may be the coefficients of the Fourier transform; the initial form of the data may be the coefficients of the Fourier transform, and the intermediate form of the data may be the coefficients in some wavelet or other expansion; the initial form of the data may be an analog signal, and the intermediate form of the data may be some digital representation of it; the initial form of the data may be digital samples of an analog signal, and the intermediate form of the data may be a quantization of the digital samples. For instance, transform coding methods for data compression in signal or data processing are realized in practice as transform of data/quantization, storage or transmission, de-quantization/reconstruction. Another class of examples consists of finite-impulse response digital filters where the input data is filtered using the indirect calculation of convolution given by Fourier transform/multiplication/inverse Fourier transform. For analog data, sampling and filtering together determine fidelity and speed of manipulation.

The invention disclosed here provides a new method for sampling analog or digital input data which may be used to calculate new wavelet transforms as well as their inverse reconstruction algorithms. This immediately provides novel and efficient methods for data compression based on this new method of non-linear transform coding. In combination with these wavelet filters, the invention also provides new methods for calculating various classical transforms including the Fourier transform and its inverse. This immediately provides novel and efficient methods for digital filtering. By way of example and not of limitation, practical applications of the methods include non-speech audio compression, speech compression, speech recognition, speech synthesis, voice printing, audio filtering for hearing aids, still two-dimensional image compression, moving video compression, video compression for purposes of telephony, precision Fourier analysis, precision trigonometry, denoising, interpolation, medical imaging, geological imaging for recovery of oil or other resources, and other emission/detection apparatus. In specific applications, it may be necessary to store streams of input data in a buffer for separate processing or manipulation while concurrently collecting further input data whether analog or digital. It may also be useful in practice in particular applications to calculate and archive or otherwise store specific coefficients or constants and recover them from memory at run time rather than computing them at run time.

DESCRIPTION OF PRIOR ART

In the landmark paper "Orthonormal bases of compactly supported wavelets, *Communications in Pure and Applied Mathematics* 41, pp. 909–996 (1988), Daubechies presented a class of wavelets which have been effectively applied in numerous contexts; see, for instance. U.S. Pat. No. 5,453,945 by Tucker et al., U.S. Pat. No. 5,606,575 by Williams, as well as Daubechies' monograph "Ten Lectures on Wavelets" SIAM (1992) and its references. In another landmark paper, "An algorithm for the machine calculation of complex Fourier series", *Mathematics of Computation* 19, pp. 297–301 (1965), J. W. Cooley and J. W. Tukey described a simplified algorithm for the calculation of Fourier series on the computer. The utility of this fast Fourier transform FFT is well known with thousands of important applications and implementations; see, for instance, U.S. Pat. No. 3,871,577 by Avellar et al., U.S. Pat. No. 3,881,100 by Works et al., U.S. Pat. No. 4,051,357 by Bonnerot, and "The DFT, an owner's manual for the discrete Fourier transform", SIAM (1995) by W. Briggs and Van Emden Henson and its references. A requirement for both the FFT method and for the multiscale filtering of the Daubechies' wavelets is that the sampling of input data must be equally spaced though further methods of adaptive refinement of grids have also been developed in each context.

Other examples of transforms whose efficient digital implementations are important and to which the invention is relevant include the transforms of Hilbert, Haar, Laplace, Bessel, Laguerre, Hermite, Chebyshev, Hotelling, Mersenne, and Fermat; see, for instance, U.S. Pat. No. 3,891,443 by Lynch et al. and U.S. Pat. No. 4,093,994 by Nussbaumer.

INVENTION SUMMARY

Three new families of wavelets, respectively called arithmetic wavelets, fan wavelets, and modular wavelets, are defined on the standard circle of radius one in the complex plane. Any complex-valued function defined on this circle may be written essentially uniquely as a complex linear combination of each family, and the approximation of specified input data as a finite linear combination for each family leads to a corresponding wavelet filter. Each filter depends upon a new quadrature on the circle, called the Farey quadrature, which relies on a novel method of non-equally-spaced sampling. The output of each wavelet filter plays the role in the invention of an intermediate representation between input data and any one of a number of useful output transformations of data which may be computed from the intermediate quantity.

With either analog or digital input data, it is convenient to think of the given input data as spatial data. The inverse wavelet transform or reconstruction algorithm requires calculating spatial data from wavelet data and admits an especially convenient implementation: the values of the spatial function at certain non-equally-spaced grids of arbitrarily fine spacing may be computed exactly using a specified finite set of wavelet coefficients. This reconstruction algorithm combines with the wavelet filter into a binary cascade giving an efficient procedure for data compression which is especially well-suited to discontinuous input data and to iterative refinement of output data. Furthermore, the methods extend directly to procedures for compression of multi-dimensional data. Computer coding for the reconstruction algorithm itself is sufficiently abbreviated and low-level that it might be transmitted together with compressed data, for instance, for down-loading from satellite to home computer.

For the calculation of classical transforms of spatial input data, it is convenient to think of the desired output data, for instance, the Fourier coefficients, as frequency data. The transform from spatial to frequency data is accomplished in two main steps, the first of which approximates the input data by wavelets using the wavelet filter. The second step is the calculation of Fourier coefficients or other frequency data in terms of wavelets and requires formulas derived in previous theoretical work. Similarly, the calculation of the inverse transform depends upon the reconstruction algorithm and known formulas which express frequency data in terms of the wavelets. The calculation of a transform or its inverse admits an elegant implementation as a binary cascade.

together with two further "descendant" chords of C labeled by the matrix products UA and TA as indicated, where $$U = \begin{pmatrix} 1 & 0 \\ 1 & 1 \end{pmatrix}$$

and $$T = \begin{pmatrix} 1 & 1 \\ 0 & 1 \end{pmatrix}.$$

The three chords determine a triangle inscribed in C, and the vertices of this triangle are indicated as complex numbers.

Figure 1A:
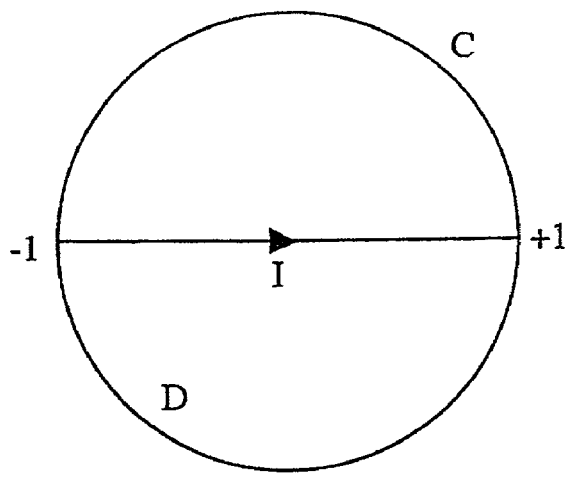
FIG. 1a illustrates the standard circle C of radius one in the complex plane, where C bounds the standard disk D of radius one. The complex numbers +1 and −1 are also indicated, and the chord of C with these endpoints is labeled by the matrix $$I = \begin{pmatrix} 1 & 0 \\ 0 & 1 \end{pmatrix}.$$
Figure 1B:
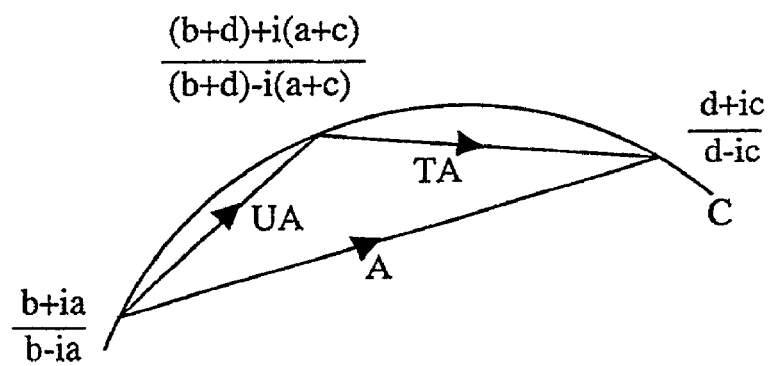
FIG. 1b illustrates a chord in the top semi-circle of C labeled by a matrix $$A = \begin{pmatrix} a & b \\ c & d \end{pmatrix},$$
Figure 1C:
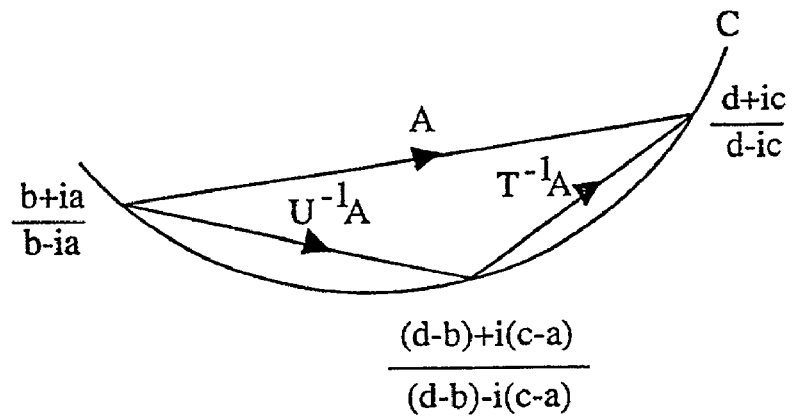

FIG. 1c illustrates a chord in the bottom semi-circle of C labeled by a matrix $$A = \begin{pmatrix} a & b \\ c & d \end{pmatrix},$$

together with two further "descendant" chords of C labeled by the matrix products $U^{-1}A$ and $T^{-1}A$ as indicated, where $$U^{-1} = \begin{pmatrix} 1 & 0 \\ -1 & 1 \end{pmatrix}$$

and $$T^{-1} = \begin{pmatrix} 1 & -1 \\ 0 & 1 \end{pmatrix}.$$

The three chords determine a triangle inscribed in C, and the vertices of this triangle are indicated as complex numbers.

Figure 2:
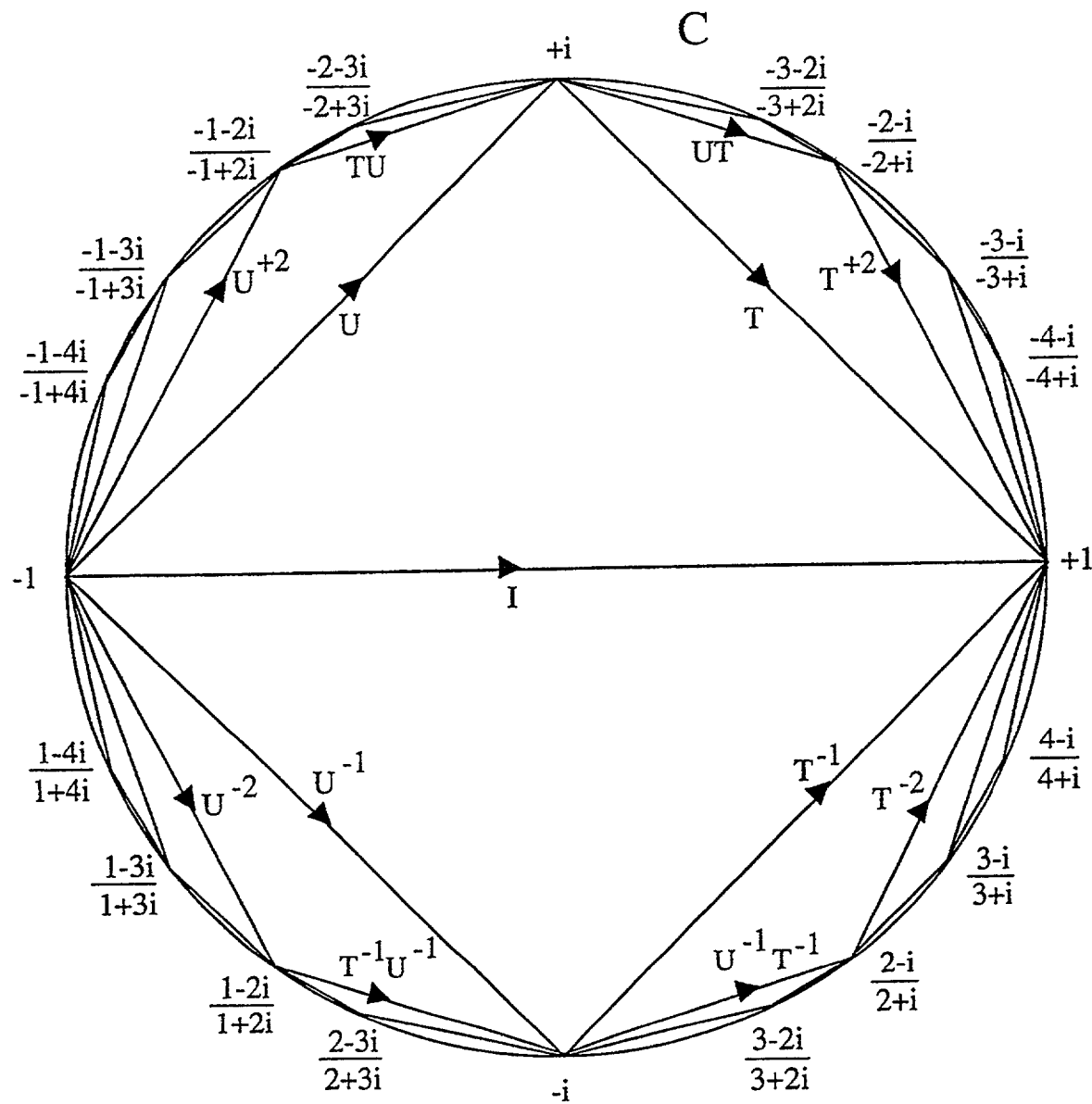

FIG. 2 depicts a classical figure in mathematics called "the Farey tesselation in Klein's model of hyperbolic geometry". It is constructed beginning from the chord in FIG. 1a by recursively taking descendants as in FIG. 1b and FIG. 1c, respectively, on the top and bottom semi-circle of C. The figure itself is classical, but the sampling of input data on C at the endpoints of the chords of the Farey tesselation in increasing generation is a novel aspect of the invention disclosed here.

FIG. 3a illustrates the circle C, the chord labeled I and the two triangles in the Farey tesselation on either side of this chord. The vertices of these triangles are indicated inside the circle as complex numbers. Outside the circle are given four explicit combinations of cosine and sine functions, one such function next to each circular arc determined by the vertices, where θ is the usual angular coordinate on the circle. A function $\tilde{\Theta}_I(\theta)$ is uniquely determined by the figure, where on each such circular arc, $\tilde{\Theta}_I(\theta)$ takes the values of the nearby combination of cosine and sine functions. The other parts FIGS. 3b–3e likewise determine analogous functions $_A(\theta)$ for other matrices $$A = \begin{pmatrix} a & b \\ c & d \end{pmatrix}.$$

These functions taken together form the system of wavelets on which the invention is based, and they are unique to this invention.

FIG. 3b illustrates the chord in the top semi-circle of C labeled with the matrix A, where a>c. As before, the figure determines a function on the circle denoted $_A(\theta)$ FIG. 3c illustrates the chord in the top semi-circle of C labeled with the matrix A, where c>=a. As before, the figure determines a function on the circle denoted $\tilde{\Theta}_A(\theta)$ FIG. 3d illustrates the chord in the bottom semi-circle of C labeled with the matrix A, where a>−c. As before, the figure determines a function on the circle denoted $\tilde{\Theta}_A(\theta)$.

FIG. 3e illustrates the chord in the bottom semi-circle of C labeled with the matrix A=, where −c>=a. As before, the figure determines a function on the circle denoted $\tilde{\Theta}_A(\theta)$.

Figure 4:
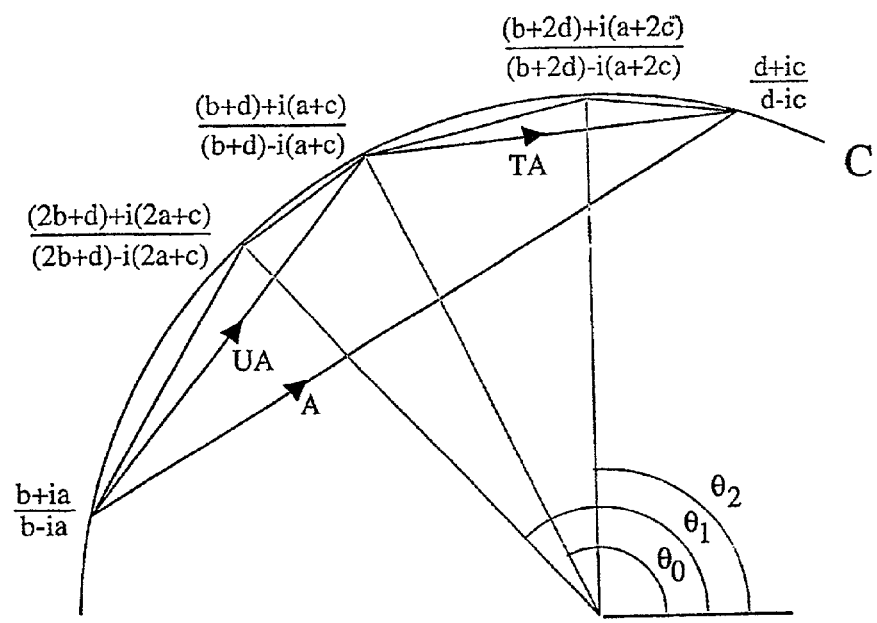

FIG. 4 illustrates the notation near the chord labeled by the matrix $$A = \begin{pmatrix} a & b \\ c & d \end{pmatrix}$$

in the top semi-circle of C; this notation will be useful in several subsequent discussions.

FIG. 5 provides a flow chart for the main driving routine in calculating the Fourier transform.

Figure 6:
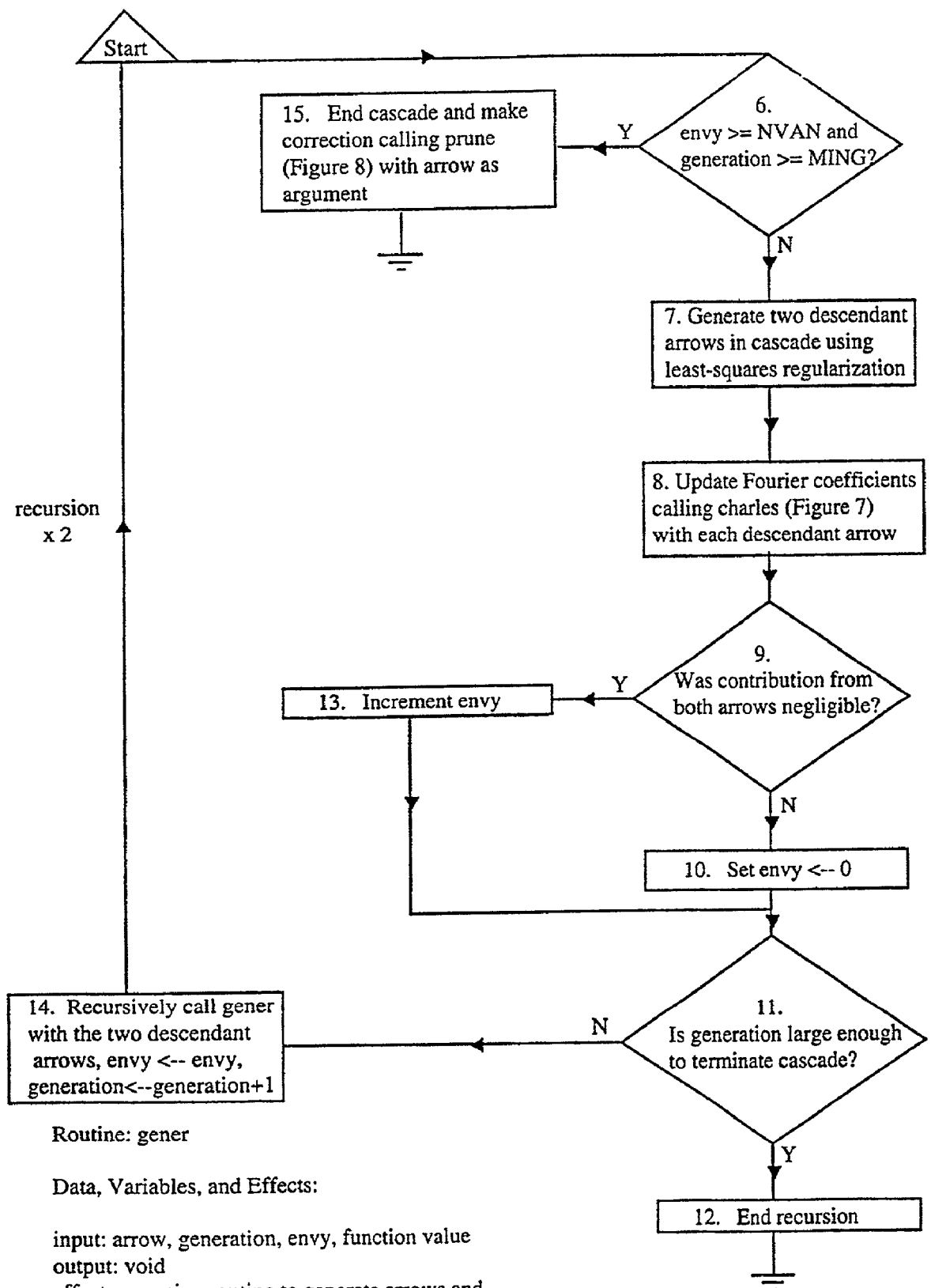

FIG. 6 provides a flow chart for the main recursive routine in calculating the Fourier transform.

Figure 7:
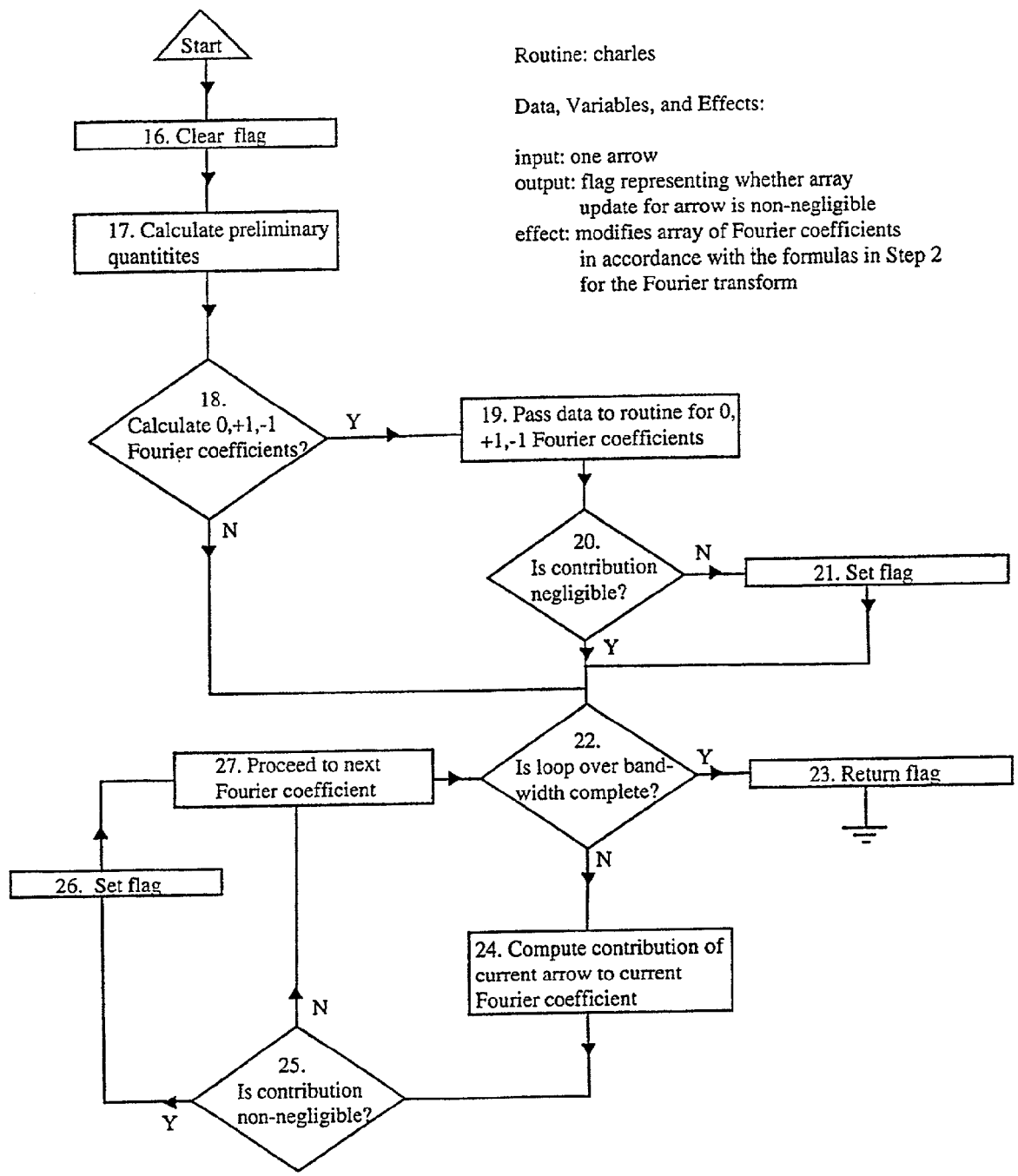

FIG. 7 provides a flow chart for the procedure of updating coefficients in calculating the Fourier transform.

Figure 8:
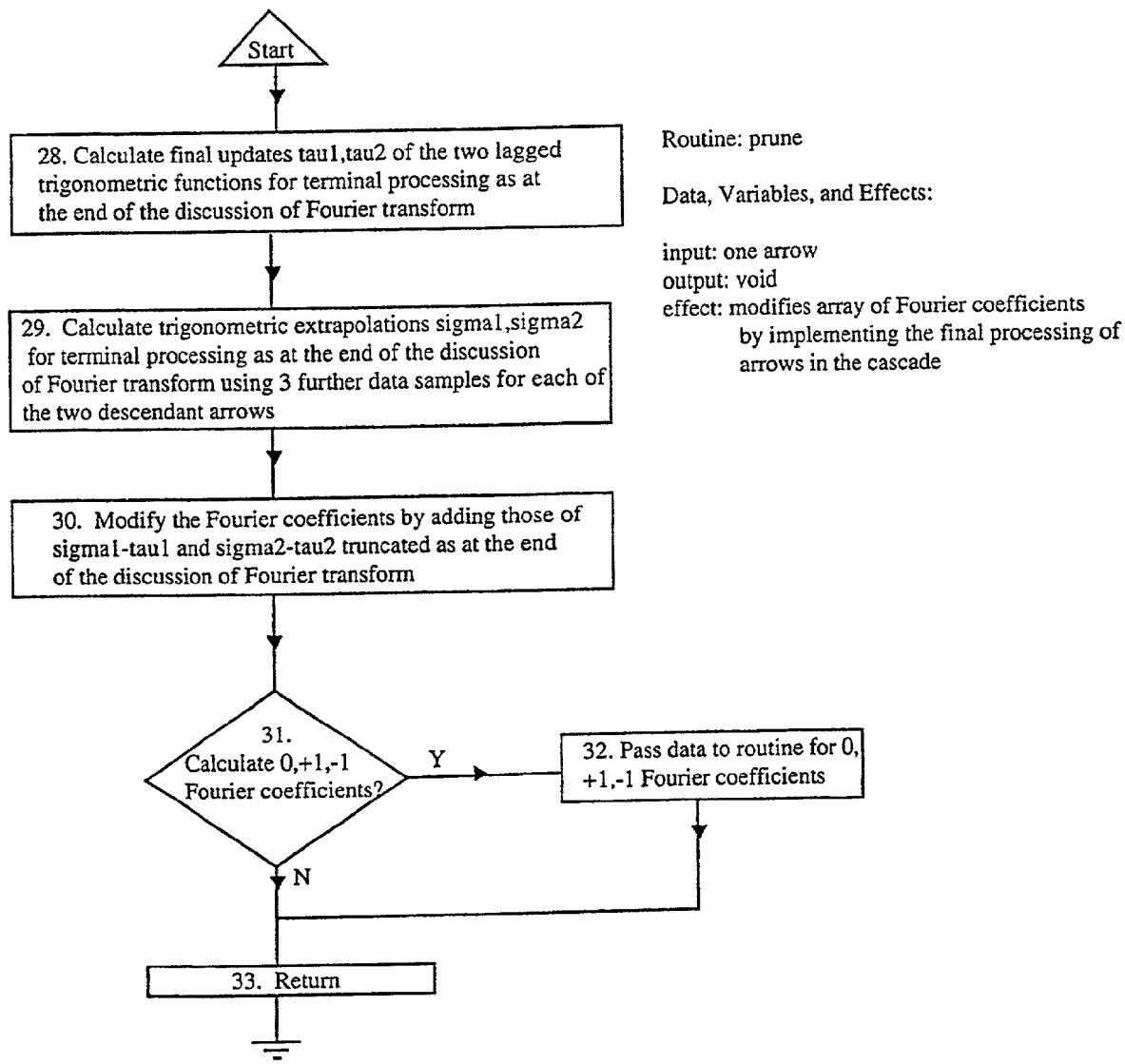

FIG. 8 provides a flow chart for the procedure of processing terminal arrows of the recursion in calculating the Fourier transform.

Figure 9:
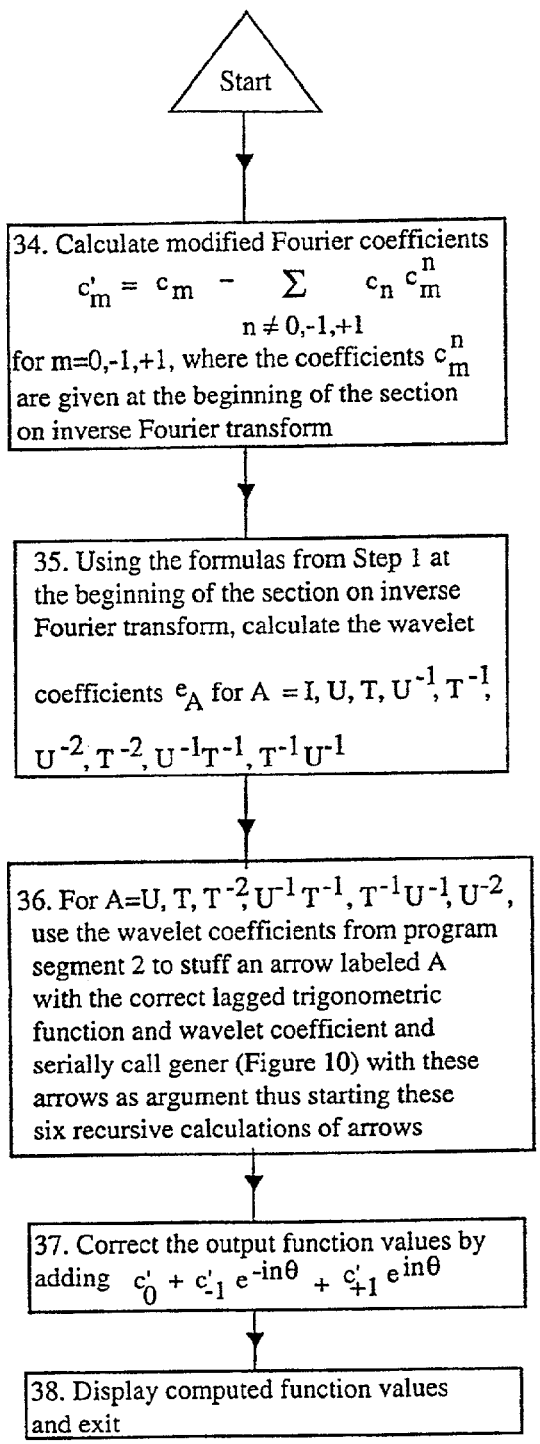

FIG. 9 provides a flow chart for the main driving routine in calculating the inverse Fourier transform.

Figure 10:
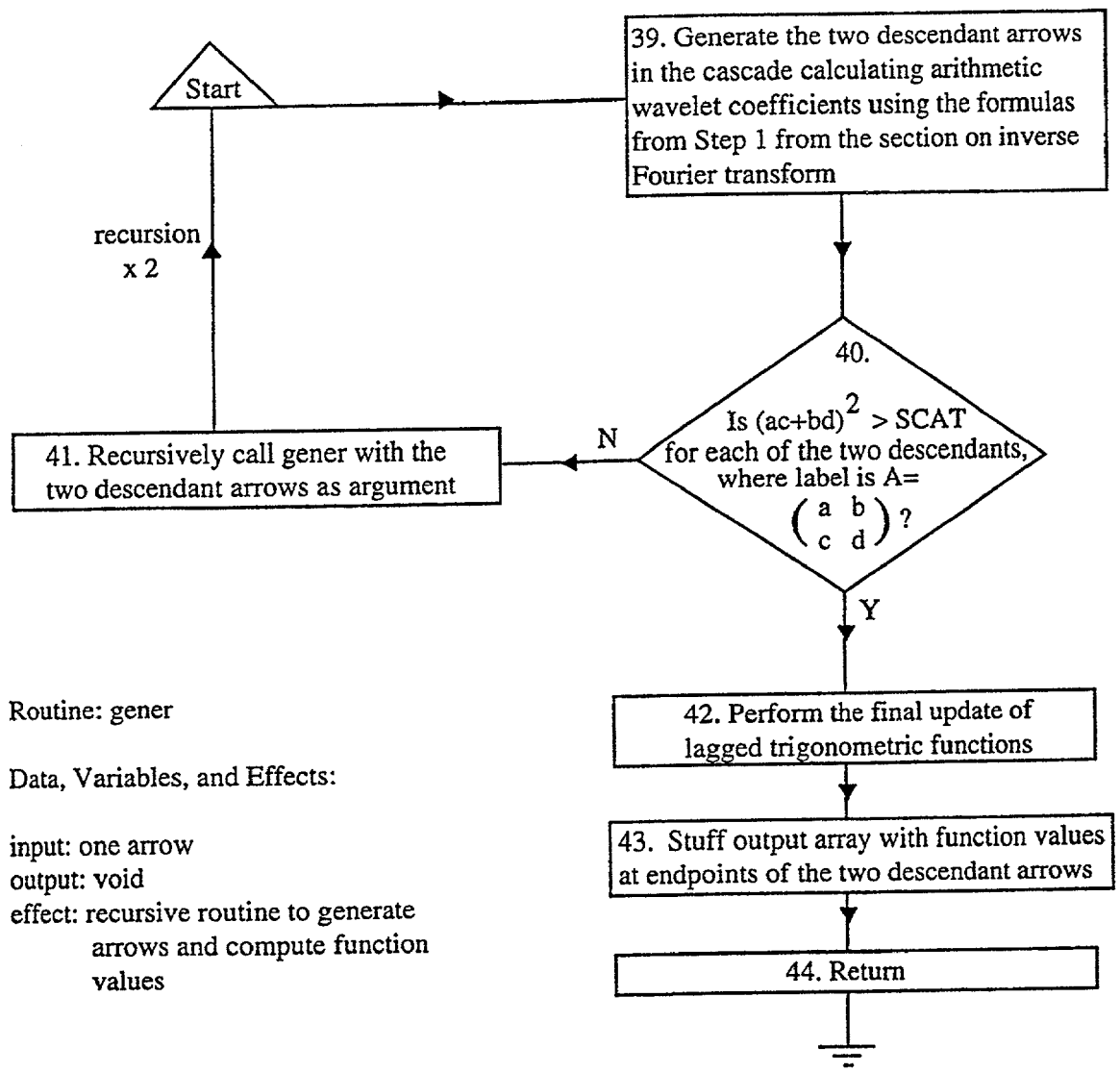

FIG. 10 provides a flow chart for the main recursive routine in calculating the inverse Fourier transform.

Figure 11:
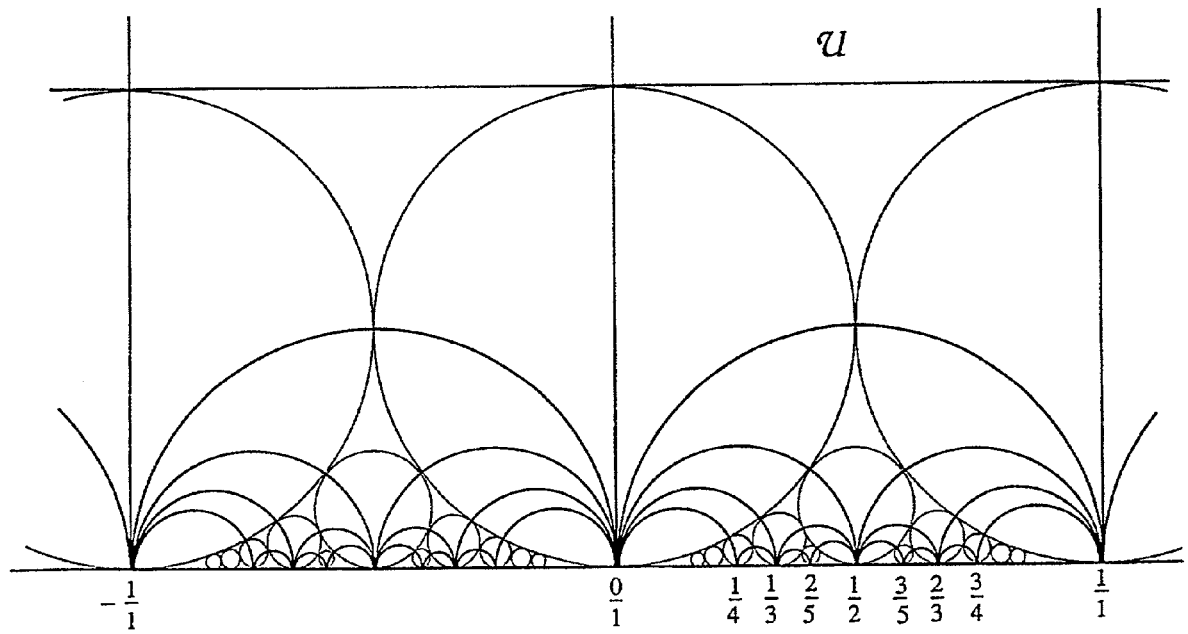

FIG. 11 illustrates the region U consisting of all complex numbers with positive imaginary part. Map the disk D to U via the function $\mapsto i(z+1)/(z-1)$; if two points in C are the endpoints of a chord in Klein's model of the Farey tesselation as in FIG. 2, then draw the semi-circle in U passing through the corresponding two points which is perpendicular to the real axis. This produces another classical figure in mathematics, called the "Farey tesselation in the upper half-space model of hyperbolic geometry", which is indicated in FIG. 11.

DESCRIPTION OF PREFERRED EMBODIMENTS

In order to disclose the methods, it is necessary to develop some notation and terminology. To this end, consider the standard disk D of radius one about the origin in the complex plane with its usual complex coordinate z=x+iy, where i=$\sqrt{-1}$ and x, y are real numbers, together with its boundary circle C as illustrated in FIG. 1a. An arrow is by definition an oriented chord of the circle C labeled by a two-by-two matrix $$\begin{pmatrix} a & b \\ c & d \end{pmatrix},$$

where the initial point of the chord is given by the complex number $$\frac{b+ia}{b-ia} \in C,$$

and the final point of the chord is given by $$\frac{d+ic}{d-ic} \in C.$$

A special arrow called the doe (short for "distinguished oriented edge") is given by the diameter of C with endpoints −1,+1 labeled by the matrix $$I = \begin{pmatrix} 1 & 0 \\ 0 & 1 \end{pmatrix}$$

as in FIG. 1a. Also required subsequently are the matrices $$S = \begin{pmatrix} 0 & -1 \\ 1 & 0 \end{pmatrix}$$

and $$U^n = \begin{pmatrix} 1 & 0 \\ n & 1 \end{pmatrix}, T^n = \begin{pmatrix} 1 & n \\ 0 & 1 \end{pmatrix},$$

for any integer n, which satisfy the identities $S^2=-I$, $SUS=-T^{-1}$, $STS=-U^{-1}$ of matrix products.

Inductively define two separate binary cascades, one of top arithmetic arrows and another of bottom arithmetic arrows, as follows:

Basis: The doe, which is illustrated in FIG. 1a, is both a top arithmetic arrow and a bottom arithmetic arrow.

Top Induction: As in FIG. 1b, given the top arithmetic arrow labeled by $$A = \begin{pmatrix} a & b \\ c & d \end{pmatrix},$$

there are also top arithmetic arrows labeled by $$UA = \begin{pmatrix} a & b \\ a+c & b+d \end{pmatrix}$$

and $$TA = \begin{pmatrix} a+c & b+d \\ c & d \end{pmatrix}.$$

Bottom Induction: As in FIG. 1c, given the bottom arithmetic arrow labeled by $$A = \begin{pmatrix} a & b \\ c & d \end{pmatrix},$$

there are also bottom arithmetic arrows labeled by $$U^{-1}A = \begin{pmatrix} a & b \\ c-a & d-b \end{pmatrix}$$

and $$T^{-1}A = \begin{pmatrix} a-c & b-d \\ c & d \end{pmatrix}.$$

It is a classical theorem in mathematics that the chords underlying any two arithmetic arrows meet only at their endpoints, if at all, and that the family of all such chords decomposes the disk D into an infinite collection of triangles with vertices in the circle C as is illustrated in FIG. 2; this figure is called "the Farey tesselation in Klein's model of hyperbolic geometry". There is no suitable reference for this procedure in the literature, and it is for completeness that the explicit recursive definition of arithmetic arrows has been given here. An arithmetic arrow is said to be of generation g if it arises from g applications of the inductive clause starting from the doe in case of either top or bottom arrows; the doe has generation zero by convention.

Consider the infinite set $Q \subseteq C$ consisting of the endpoints of chords underlying all arithmetic arrows, and say a point of Q is of generation g if it is the endpoint of the chord underlying an arrow of generation g and no less; −1 and +1 are of generation zero by convention. There is a canonical enumeration of the generation g points of Q clockwise in C starting from −1 and the associated enumeration of Q itself by increasing generation. For example, the ordering begins with:

$$-1, +1, +i, -i, \frac{-1-2i}{-1+2i}, \frac{-2-i}{-2+i}, \frac{2-i}{2+i}, \frac{1-2i}{1+2i}, \frac{-1-3i}{-1+3i}, \ldots.$$

Given input data on the circle C, the sampling of it at the points $Q \subseteq C$ in this order of increasing generation will be referred to as the Farey quadrature. In practice, one might interpolate given data as required at the sampling points of the Farey quadrature or restrict the Farey quadrature to a circular arc in C. (In the subsequent discussion of mathematical basis, the sample points of the Farey quadrature will be seen to correspond to the rational points in the real line enumerated in increasing order, where the generation is the length of a corresponding continued fraction expansion.)

Notice that the doe separates the triangle with vertices −1,+1, −i from the triangle with vertices −1,+1,+i. In the same way, an arbitrary arithmetic arrow separates two triangles complementary to all the arithmetic arrows in D. The endpoints of chords of these triangles in various cases are illustrated in FIGS. 3*a*–3*e* as functions of the matrix $$A = \begin{pmatrix} a & b \\ c & d \end{pmatrix}$$

labeling the arithmetic arrow. FIG. 3*a* depicts the doe itself with A =I, FIGS. 3*b* and 3*c* depict top arrows with a>c and c≧a, respectively, and FIGS. 3*d* and 3*e* depict bottom arrows with a>−c and −c≧a, respectively. The notation inside the circles indicates the endpoints of the chords as complex numbers, and the notation outside the circles in each case of FIGS. 3*a*–3*e* is yet to be explained.

To this end, define a trigonometric function to be a real-valued function $$f(\theta) = \alpha \cos \theta + \beta \sin \theta + \gamma,$$

where θ is the usual angular coordinate on the unit circle C and α, β, γ are real numbers. Next, define a piecewise trigonometric function on the circle to be a function f(θ) so that there is a finite collection of circular arcs $I_j \subseteq C$, for j= 1, . . . J, any two of which meet at common endpoints in C, if at all, together with a collection of trigonometric functions $t_j(\theta)$ for j=1, . . . ,J, so that $f(\theta) = t_j(\theta)$ if $\theta \in I_j$. In other words, C is decomposed into a finite number of non-overlapping circular arcs, and on each such arc, f takes the values of a trigonometric function.

There is a particular family of piecewise trigonometric functions, one such arithmetic wavelet $\tilde{\Theta}_A(\theta)$ for each matrix A labeling an arithmetic arrow. These functions are defined in FIGS. 3*a*–3*e*, where the endpoints of the circular arcs are as described before, and each trigonometric function is written outside the circle next to its corresponding circular arc. There are thus five cases in the definition of arithmetic wavelet corresponding to the five cases in FIGS. 3*a*–3*e* already discussed, and in each case, the arithmetic wavelet itself is a piecewise trigonometric function defined using exactly four circular arcs. Arithmetic wavelets are a fundamental new ingredient of this invention and no doubt seem entirely ad hoc and unmotivated at this juncture of the discussion. The mathematical basis for them will be given later, but it is worth pointing out now that each arithmetic wavelet $\tilde{\Theta}_A(\theta)$ is a once-continuously differentiable function taking value zero at the points −1,+1, −i of the circle C, that is, for θ=0, −π/2, −π, except for $\tilde{\Theta}_{U^{-1}}(\theta)$ and $\tilde{\Theta}_{T^{-1}}(\theta)$ which take the value zero only at the points ±1.

In order to explicate the definition of arithmetic wavelets, notice that any two-by-two matrix $$A = \begin{pmatrix} a & b \\ c & d \end{pmatrix}$$

determines a self-mapping $M_A: C \to C$ of the circle C as follows:

$$M_A\left(\frac{t-i}{t+i}\right) = \frac{(ta+b)-i(tc+d)}{(ta+b)+i(tc+d)},$$

and in fact, the image of the endpoints, −1 and +1, of the doe under $M_A$ are the endpoints of the arithmetic arrow with label A. Construct from the function $\tilde{\Theta}_A(\theta)$ defined on C in FIG. 3*a* the corresponding vector field on C given by $$\tilde{\partial}_I(\theta)\frac{\partial}{\partial \theta},$$

where $$\frac{\partial}{\partial \theta}$$

is the usual unit tangent vector field to C.

There is an explicit formula to be given presently for the transformation of suitable vector fields under the change of coordinates on C given by $M_A$. Namely, the vector field $$t(\theta)\frac{\partial}{\partial\theta} = [\alpha\cos\theta + \beta\sin\theta + \gamma]\frac{\partial}{\partial\theta}$$

transforms under $M_A$ to the vector field $$t^A(\theta)\frac{\partial}{\partial\theta},$$

where $$t^A(\theta) = \begin{cases} \frac{1}{2}[2(cd-ab)\beta + (d^2-b^2)(\alpha+\gamma) + \\ (a^2-c^2)(\alpha-\gamma)]\cos\theta + [(ad+bc)\beta + bd(\alpha+\gamma) - \\ ac(\alpha-\gamma)]\sin\theta + \frac{1}{2}[2(cd+ab)\beta + (d^2+b^2)(\alpha+\gamma) - \\ (a^2+c^2)(\alpha-\gamma)] \end{cases}.$$

More generally, given a piecewise trigonometric function $f(\theta)$ taking the values of the trigonometric function $t_j(\theta)$ on the circular arc $I_j$ as before, the corresponding vector field $$f(\theta)\frac{\partial}{\partial\theta}$$

transform under $M_A$ to the vector field which on the circular arc $M_A(I_j)$ is given by $$t_j^A(\theta)\frac{\partial}{\partial\theta}.$$

Changing coordinates on C by $M_A$ using this formula transforms the vector field $$\tilde{\partial}_f(\theta)\frac{\partial}{\partial\theta}$$

to another vector field $$\tilde{\partial}_A(\theta)\frac{\partial}{\partial\theta},$$

thereby defining the function $\tilde{\Theta}_A(\theta)$ on C. Finally except for $A=U^{-1}$ and $A=T^{-1}$, the corresponding arithmetic wavelet is given by $$\tilde{\Theta}_A(\theta)=\tilde{\partial}_A(\theta)-[\alpha\cos\theta + \beta\sin\theta + \gamma],$$

where $\alpha,\beta,\gamma$ are chosen so that $\tilde{\Theta}(\pi)=\tilde{\Theta}(0)=\tilde{\Theta}(-\pi/2)=0$; the two special cases are $$\tilde{\Theta}_{U^{-1}}(\theta)=\tilde{\partial}_{U^{-1}}(\theta)+2\sin\theta \text{ and } \tilde{\Theta}_{T^{-1}}(\theta)=\tilde{\partial}_{T^{-1}}(\theta)-2\sin\theta$$

(which are defined in this manner to guarantee a symmetry of the upper and lower semi-circles of C). This is the abstract definition of arithmetic wavelets which is made explicit in FIG. 3.

It is furthermore convenient to define $$\overline{\partial}_A(\theta) = \begin{cases} \tilde{\partial}_A(\theta); & \text{if } A \neq U^{-1}, T^{-1}, \\ \partial_{U^{-1}}(\theta); & \text{if } A = U^{-1}, \\ \partial_{T^{-1}}(\theta); & \text{if } A = T^{-1}, \end{cases}$$

so that for every label A on an arithmetic arrow, $\tilde{\Theta}_A(\pi) = \tilde{\Theta}_A(0) = \tilde{\Theta}_A(-\pi/2) = 0$.

The arithmetic wavelets enjoy an important renormalization property, namely, $$\tilde{\Theta}_{BA}(M_A(\theta)) = M'_A(\theta)\,\tilde{\Theta}_B(\theta),$$

where the prime denotes the usual derivative and where it is required that either both matrices B and A are matrix products of $U^{+1}$, $T^{+1}$ or both matrices B and A are matrix products of $U^{-1}$, $T^{-1}$.

Just as a function $f=f(\theta)$ may be expressed in its representation as a Fourier series $f \sim \Sigma_n c_n e^{in\theta}$, so too it may be expressed as a series $f \approx \Sigma e_A \tilde{\Theta}_A(\theta)$ of arithmetic wavelets, which together form a linearly independent set. The sum is over all arithmetic arrows, and the coefficients $e_A$ are called the arithmetic wavelet coefficients. The calculation of arithmetic wavelet coefficients from the input data f is called the arithmetic wavelet filter. The arithmetic wavelet coefficients are not quite uniquely determined by f as will be explained.

The reconstruction algorithm or inverse wavelet transform provides a method for calculating function values at points of the circle from arithmetic wavelet coefficients. To determine the value of the sum $\Sigma e_A \tilde{\Theta}_A$ at a specified point $q \in Q \subseteq C$, draw a line segment from q to the origin in D; this segment is contained in a finite collection of triangles complementary to all arithmetic arrows, whose boundary edges taken together form a finite set of chords; the corresponding finite set of arithmetic arrows A enumerates the only coefficients $e_A$ which affect the value of $\Sigma_{A \in S} e_A \tilde{\Theta}_A$ at q. This is an important finiteness property of arithmetic wavelets which is crucial to the efficiency of the reconstruction algorithm.

This completes the general discussion of arithmetic wavelets, the first family of new wavelets disclosed here, and the two further families of new wavelets are next defined.

For each label A on an arithmetic arrow, there are two fan wavelets $$\phi_A(\theta) = \sum_{n \geq 0} \overline{\partial}_{U^n A}(\theta),$$

$$\phi_{SA}(\theta) = \sum_{n \geq 0} \overline{\partial}_{T^{-n} A}(\theta),$$

as well as two modular wavelets $$\psi_A(\theta) = \sum_{n \geq 0} n\overline{\partial}_{U^n A}(\theta),$$

-continued $$\psi_{SA}(\theta) = \sum_{n \geq 0} n \tilde{\partial}_{T^{-n}A}(\theta).$$

It follows immediately from the definitions that there are the following relations among the wavelets for any label A on an arithmetic arrow.

$$\phi_A(\theta) = \psi_{U^{-1}A}(\theta) - \psi_A(\theta), \phi_{SA}(\theta) = \psi_{U^{-1}SA}(\theta) - \psi_{SA}(\theta),$$

$$\tilde{\partial}_A(\theta) = \phi_A(\theta) - \phi_{UA}(\theta) = \phi_{SA}(\theta) - \phi_{USA}(\theta)$$
$$= \psi_{U^{-1}A}(\theta) - 2\psi_A(\theta) + \psi_{UA}(\theta) = \psi_{U^{-1}SA}(\theta) - 2\psi_{SA}(\theta) + \psi_{USA}(\theta).$$

On the other hand as is not at all obvious from the definitions, $\phi_I$ and $\psi_I$ are given by the following explicit formulas as piecewise trigonometric functions $$\phi_I = \begin{cases} 2\sin\theta; & \text{if } 0 \leq \theta \leq \pi, \\ -2\cos\theta - 2\sin\theta - 2; & \text{if } \pi \leq \theta \leq 3\pi/2, \\ -2\cos\theta + 2\sin\theta + 2; & \text{if } 3\pi/2 \leq \theta \leq 2\pi, \end{cases}$$

and $$\psi_I(\theta) -= \begin{cases} 2 - 2\cos\theta; & \text{if } 0 \leq \theta \leq \pi, \\ 0; & \text{if } \pi \leq \theta \leq 2\pi. \end{cases}$$

In fact, modular wavelets arise from $\psi_I$ in exactly the same manner that arithmetic wavelets arise from $\tilde{\Theta}_I$, namely, $$\psi_I(\theta) \frac{\partial}{\partial \theta}$$

transforms under $M_A$ to the vector field $$\psi_A^*(\theta) \frac{\partial}{\partial \theta},$$

and $\phi_A(\theta) = \psi_A^*(\theta) - [\alpha \cos \theta + \beta \sin \theta + \gamma]$, where $\alpha$, $\beta$, $\gamma$ are chosen to guarantee that $\psi_A(0) = \psi_A(\pi) = \psi_A(-\pi/2) = 0$; transforming $$\psi_I(\theta) \frac{\partial}{\partial \theta}$$

using the change of coordinates given by $M_{SA}$ likewise gives rise to $\psi_{SA}(\theta)$. The fan wavelets also arise from $\phi_I$ in the analogous manner.

In contrast to arithmetic wavelets, neither the fan nor modular wavelets are linearly independent, and in each case, there is one linear relation for each arithmetic arrow, namely, $$\phi_A - \phi_{UA} = \phi_{SA} - \phi_{USA},$$

$$\psi_{U^{-1}A} - 2\psi_A + \psi_{UA} = \psi_{U^{-1}SA} - 2\psi_{SA} + \psi_{USA}.$$

On the other hand, the following collection of modular wavelets forms a basis

{$\phi_A$: A labels a top arithmetic arrow and $c \geq a$}

U {$\psi_{SA}$: A labels a top arithemtic arrow and $a > c$}

U {$\psi_A$: A labels a bottom arithemtic arrow and $-c \geq a$}

U {$\psi_{SA}$: A labels a bottom arithemtic arrow and $a > -c$};

there is an analogous basis for the fan wavelets.

Both fan and modular wavelets enjoy precisely the same finiteness property as arithmetic wavelets. Furthermore, both fan and modular wavelets enjoy renormalization properties, namely, $$\phi_{BA}(M_A(\theta)) = M'_A(\theta) \phi_B(\theta),$$

$$\psi_{BA}(M_A(\theta)) = M'_A(\theta) \psi_B(\theta),$$

where the requirements on A, B are as before.

This completes the necessary abstract definitions. The methods will first be presented using arithmetic wavelets for real-valued input functions with extensions to modular and fan wavelets and complex-valued or multi-dimensional input/output data to be described later. As a point of notation throughout these discussions, there will be the tacit assumption that the entries in the matrix denoted A are given by $$\begin{pmatrix} a & b \\ c & d \end{pmatrix}.$$

The Fourier Transform

Included in the section entitled "Source Codes" is an implementation in the computer language C of a preferred embodiment of the method described in this section employing arithmetic wavelets.

Suppose that $f(\theta)$ is some specified real-valued input function defined on the circle. The calculation of the Fourier transform of f proceeds by two main steps:

Step 1: Choose a finite set S of arithmetic arrows and approximate $f \approx \Sigma_{A \in S} e_A \tilde{\Theta}_A$ calculating the coefficients $e_A$ in a manner to be described in terms of the values of f at specified points using the Farey quadrature.

Step 2: Substitute into the expression in Step 1 the known Fourier expansions $\tilde{\Theta}_A(\theta) \sim \Sigma_n c_n^A e^{in\theta}$ in order to derive the approximation $$c_n = \sum_{A \in S} e_A c_n^A.$$

The coefficients require in Step 2 are known theoretically and given for $n \neq 0, \pm 1$ by $$\pi i(n^3 - n) c_n^A =$$
$$-[(c-a)^2 + (b-d)^2] \left[ \frac{(b-d) - i(a-c)}{(b-d) + i(a-c)} \right]^n + 2(c^2 + d^2) \left[ \frac{d - ic}{d + ic} \right]^n +$$

-continued $$2(a^2+b^2)\left[\frac{b-ia}{b+ia}\right]^n - [(c+a)^2+(b+d)^2]\left[\frac{(b+d)-i(a+c)}{(b+d)+i(a+c)}\right]^n.$$

Furthermore, the coefficients $c_0^A$, $c_1^A$, $c_{-1}^A$, are given by $\pi c_{\pm 1}^A = \theta_h(c^2-d^2\pm 2icd)+\theta_t[(b-d)^2-(a-c)^2 \mp 2i(b-d)(a-c)]/2+\theta_l(a^2-b^2\pm 2iab)+\theta_l[(b+d)^2-(a+c)^2 \mp 2i(b+d)(a+c)]/2,$ $\pi c_0^A = 2\theta_h(c^2+d^2)-\theta_r[(b-d)^2+(a-c)^2]+2\theta_t(a^2+b^2)-\theta_l[(b+d)^2+(a+c)^2],$ where the angles are $$\theta_h = \tan^{-1}\left(\frac{2cb}{d^2-c^2}\right), \quad \theta_l = \tan^{-1}\left(\frac{2(b+d)(a+c)}{(b+d)^2-(a+c)^2}\right),$$

$$\theta_t = \tan^{-1}\left(\frac{2ab}{b^2-a^2}\right), \quad \theta_T = \tan^{-1}\left(\frac{2(b-d)(a-c)}{(b-d)^2-(a-c)^2}\right).$$

It may be useful in practice in particular applications to calculate and archive or otherwise store the constants required in the previous expressions for $c_n^A$ and recover them from memory at run time rather than computing them at run time.

The Fourier coefficients $c_0$, $c_{\pm 1}$ of f thus require special treatment which does not present additional challenges. For simplicity, suppose that the input function f ($\theta$) has these three coefficients fixed by the condition that f($\theta$)=0 for $\theta$=0, $-\pi/2$, $-\pi$. More precisely, if f ($\theta$) is any real-valued function on the circle, then let $\tilde{f}(\theta)$ denote its normalization defined by $\tilde{f}(\theta)=f(\theta)+\alpha \cos \theta+\beta \sin \theta+\gamma$, where $\alpha$, $\beta$, $\gamma$ are chosen so that $\tilde{f}$ takes value zero at 0, $-\pi/2$, $-\pi$. The specified simplifying assumption on f thus amounts to the condition that $f=\tilde{f}$.

The procedure for calculating wavelet coefficients is slightly different depending upon whether the corresponding arithmetic arrow is a top or bottom arrow. However, the antipodal map $\theta \mapsto \pi+\theta$ transforms the bottom of the circle C to the top in such a way that it suffices to discuss only the case of top arrows. More precisely, the algorithm for bottom arrows arises from that for top arrows by:

replacing the input data value f ($\theta$) with the input data value f ($\theta+\pi$), replacing the matrix A in the described manipulations for top arrows by the conjugate matrix SAS for bottom arrows, and replacing the trigonometric function $\alpha\cos \theta+\beta\sin \theta+\gamma$ for top arrows by the trigonometric function $-\alpha\cos \theta-\beta\sin \theta+\gamma$ for bottom arrows.

The algorithm and computer coding for bottom arrows is therefore derived without difficulty from that for top arrows, and the subsequent discussion is specialized without loss of generality to top arrows.

In addition to the function f ($\theta$) defined on the circle, suppose that there is also specified a bandwidth of interest N (i.e. the method should calculate the Fourier coefficients $C_n$, only in the range $|n|\leq N$) and a tolerance EPS (where contributions to the specified Fourier coefficients are regarded as negligible if they are of magnitude less than EPS). There are numerous variants of the method which depend upon other parameters which may be tailored to a given application, and some these variants will be discussed further.

Steps 1 and 2 are merged into a single binary cascade which keeps track of an ongoing approximation to the Fourier coefficients as follows. A cascade element is called an arrow-structure and is defined to consist of the specification of an arithmetic arrow A of generation g, the wavelet coefficient $e_A$ on $\tilde{\Theta}_A$ in the approximation of f, the coefficients $\alpha$, $\beta$, $\gamma$ of a trigonometric function defined as follows. The endpoints of the chord corresponding to A decompose C into two circular arcs, exactly one of which contains none of the points $-1,+1,-i$. The sum $\Sigma_{B \neq A} e_B \tilde{\Theta}_B$ over all arithmetic arrows B of generation at most g except for A itself is given on this interval by the particular trigonometric function $\alpha \cos \theta+\beta \sin \theta+\gamma$.

The coefficients $\alpha$, $\beta$, $\gamma$ in an arrow-structure keep a lagged/updated running tally of the overall effect of what has come before it in the cascade; as a result of this technique, the method requires essentially no memory other than the storage of the running approximation to Fourier coefficients and the stack required for the recursive computation in the cascade of arrow-structures.

The next technical point involves a regularization in the calculation of arithmetic wavelet coefficients; this regularization is required because the approximation to f as a linear combination $\Sigma_{A \delta S} e_A \tilde{\Theta}_A$ is not uniquely determined. Given an arrow-structure in the specified notation and referring to FIG. 4, when sampling the input data at the point $$\frac{(b+d)+i(a+c)}{(b+d)-i(a+c)}$$

in the Farey enumeration with corresponding angular coordinate $\theta_0$, the one real input datum $f(\theta_0)$ must determine the two coefficients $e_{UA}$ and $e_{TA}$. According to the formulas presented in FIGS. 3a–3e, these new coefficients are constrained by $$f(\theta_0) = \alpha\left[\frac{(b+d)^2-(a+c)^2}{(b+d)^2+(a+c)^2}\right] + \beta\left[\frac{2(a+c)(b+d)}{(b+d)^2+(a+c)^2}\right] + \gamma + \frac{4(e_{UA}-e_{TA})}{(b+d)^2+(a+c)^2} + \frac{8\,e_A\mathrm{sgn}(a-c)}{(b+d)^2+(a+c)^2},$$

where sgn (a–c) is a sign defined to be +1 if a>c and –1 otherwise. There remains, however, one real degree of freedom in the specification of $e_{UA}$, $e_{TA}$, and it is eliminated by demanding the best least-squares fit to the values of f at the next generation of points $$\frac{(2b+d)+i(2a+c)}{(2b+d)-i(2a+c)}, \frac{(b+2d)+i(a+2c)}{(b+2d)-i(a+2c)}$$

with respective angular coordinates $\theta_1$ and $\theta_2$ as illustrated in FIG. 4. Updating the lagged trigonometric coefficients in accordance with the formulas presented in FIGS. 3a–3e produces trigonometric functions $V_1(\theta)$ and $V_2(\theta)$ which give the values of the ongoing approximations at $\theta_1$ and $\theta_2$, respectively, and whose coefficients are explicit inhomogeneous linear functions of $e_{UA}$, $e_{TA}$, namely, $V_i(\theta_i)=\mathrm{vic}+\mathrm{viu}\,e_{UA}+\mathrm{vit}\,e_{TA}$, for i=1, 2.

The coefficients are explicitly described most concisely in pseudo-code, where e=$e_A$, alp=α, bet =β, gam=γ, bpd=b+d and apc=a+c:

```
if(a>c){
    ax1=alp+(d*d-c*c+2*(a*c-b*d)+a*a-b*b)*2*e;
    ay1=2*(b*b-a*a);
    bx1=bet+(c*d-a*d-b*c-a*b)*4*e;
    by1=4*a*b;
    cx1=gam+(2*(a*c+b*d)-c*c-d*d+a*a+b*b)*2*e;
    cy1=-2*(a*a+b*b);
    ax2=alp+4*(d*d-c*c)*e;
    ay2=2*(c*c-d*d);
    bx2=bet+8*e*c*d;
    by2=-4*c*d;
    cx2=gam-4*e*(c*c+d*d);
    cy2=2*(c*c+d*d);
}.
else{
    ax1=alp+4*e*(a*a-b*b);
    ay1=2*(b*b-a*a);
    bx1=bet-8*e*a*b;
    by1=4*a*b;
    cx1=gam+4*e*(a*a+b*b);
    cy1=-2*(a*a+b*b);
    ax2=alp+(a*a-b*b+2*(b*d-a*c)-c*c+d*d)*2*e;
    ay2=2*(c*c-d*d);
    bx2=bet+(a*d-a*b+b*c+c*d)*4*e;
    by2=-4*c*d;
    cx2=gam+(a*a+b*b-2*(a*c+b*d)-c*c-d*d)*2*e;
    cy2=2*(c*c+d*d);
}
```

$v1c=cx1+(((b+bpd)*(b+bpd)-(a+apc)*(a+apc))*ax1+2*(b+bpd)*(a+apc)*bx1)/((b+bpd)*(b+bpd)+(a+apc)*(a+apc));$ $v1t=cy1+(((b+bpd)*(b+bpd)-(a+apc)*(a+apc))*ay1+2*by1*(b+bpd)*(a+apc))/((b+bpd)*(b+bpd)+(a+apc)*(a+apc));$ $v1u=8./((b+bpd)*(b+bpd)+(a+apc)*(a+apc));$ $v2c=cx2+(((d+bpd)*(d+bpd)-(c+apc)*(c+apc))*ax2+2*(d+bpd)*(c+apc)*bx2)/((d+bpd)*(d+bpd)+(c+apc)*(c+apc));$ $v2u=cy2+(((d+bpd)*(d+bpd)-(c+apc)*(c+apc))*ay2+2*(d+bpd)*(c+apc)*by2)/((d+bpd)*(d+bpd)+(c+apc)*(c+apc));$ $v2t=-8./((d+bpd)*(d+bpd)+(c+apc)*(c+apc));$ It is easy to minimize $[f(\theta_1)-V_1(\theta_1)]^2+[f(\theta_2)-V_2(\theta_2)]^2$ as a function of $e_{UA}$, $e_{TA}$ subject to the given constraint, and this procedure provides a suitable regularization.

Weighted least-squares fits or other statistical treatments using input data values at further generations allow alternative regularizations.

Two other simple regularizations which have also been useful are: to require that $e_{UA}=0$ if c≧a and $e_{TA}=0$ if a>c, or, to require that $e_{UA}/e_{TA}=-[a(a+c)+b(b+d)]/[c(a+c)+d(b+d)]$; the latter regularization is related to imposing differentiability of the approximation at $\theta_0$.

The final technical point involves the stopping criteria and terminal processing for the cascade of arrow-structures. The basic stopping parameter is NVAN, where a branch of the cascade terminates whenever there have been NVAN consecutive generations of offspring whose contributions to all coefficients $c_n$ in the bandwidth N have been of magnitude at most EPS. There are further parameters governing stopping criteria which may be introduced depending upon the scale and resolution of features in the input data, including a minimum or maximum number of generations, the size of the angle subtended by the chord of a terminal arrow-structure, and so on.

Another useful stopping criterion is to require that $|e_A| \|\tilde{\Theta}_A\|$ be negligible for several generations, where $\|\tilde{\Theta}_A\|$ denotes the $L^2$-norm of $\tilde{\Theta}_A$ for which there is the a priori estimate $\|\tilde{\Theta}_A\| \leq 10|ac+bd|^{-5/4}$; that is, one terminates the cascade when NVAN consecutive generations of coefficients $e_A$ have satisfied the condition that $$|e_A| < \frac{1}{10}EPS|ac+bd|^{5/4}.$$

When NVAN generations of offspring contribute negligibly to the specified bandwidth, the cascade is terminated with those offspring of greatest generation. Suppose that A labels the arrow of such a terminal offspring, adopt the notation in FIG. 4, and let J ⊆ C denote the circular arc with endpoints $$\frac{b+ia}{b-ia}, \frac{d+ic}{d-ic}$$

which contains none of the points −1, −i,+1 ∈ C. The final update $\tau_i$=alpi cos θ+beti sin θ+gami, for i=1, 2, of the running trigonometric function on J in accordance with FIGS. 3a–3e is prescribed in pseudo-code with notation as before as follows:

```
if(a>c){
    alp1=alp+e*2*(a*(a+c)+d*(d-b)-b*(b+d)-c*(c-a));
    bet1=bet+e*4*(c*(d-b)-a*(d+b));
    gam1=gam+e*2*(a*(a+c)+c*(a-c)+b*(b+d)-d*(d-b));
    alp2=alp+e*4*(d-c)*(d+c);
    bet2=bet+e*8*c*d;
    gam2=gam-e*4*(c*c+d*d);
else{
    alp1=alp+e*4*(a-b)*(a+b);
    bet1=bet-e*8*a*b;
    gam1=gam+e*4*(a*a+b*b);
    alp2=alp+e*2*(a*(a-c)+b*(d-b)-c*(c+a)+d*(b+d));
    bet2=bet+e*4*(a*(d-b)+c*(b+d));
    gam2=gam+e*2*(a*(a-c)-c*(a+c)-b*(d-b)-d*(b+d));
}
```

Now serially letting τ denote the trigonometric functions $\tau_1$ and $\tau_2$, again adopt the notation of FIG. 4, where A labels the arrow corresponding to τ. The updated τ is compared with another trigonometric function σ defined by extrapolation which is uniquely determined by demanding that it agree with f at the three angles comprising the next two generations, $\theta=\theta_0$, $\theta_1$, $\theta_2$ in the notation of FIG. 4. The Fourier coefficients of the piecewise trigonometric function which takes values $\sigma(\theta)-\tau(\theta)$ on the circular arc J and value zero otherwise are easily computed using standard formulas and added to those of the ongoing approximation.

Other algebraic or statistical samplings of higher generation offspring allow alternative final processings.

For instance, one might save computational expense and simply terminate the cascade with no final processing at all.

Furthermore, the terminal arrow-structures could be stored for restart or iterative refinement capabilities.

One might alternatively record in an arrow-structure different transforms of the trigonometric function defined by $\alpha$, $\beta$, $\gamma$. For instance, it is useful to take advantage of the renormalization property of wavelets and change these coefficients by transforming the vector field $$[\alpha\cos\theta + \beta\sin + \gamma]\frac{\partial}{\partial\theta}$$

by the change of coordinates $M_A^{-1}$ This technique avoids the necessity of calculating certain large integers attendant to the calculation of wavelet coefficients as will be illustrated later.

One favorable aspect of the method is its advantageous mix of floating-point and integer operation types. Moreover, except for the coefficients $c_0$, $c_{\pm 1}$, the implementation of the algorithm is purely algebraic, that is, requires only addition and multiplication. Furthermore, by its very nature as a cascade, the algorithm is amenable to parallelization and efficient hardware implementation.

This completes the description of the implementation of the method of calculating Fourier coefficients using arithmetic wavelets.

Several points will next be addressed which are special to the implementation of the methods using modular wavelets. Again there is a basic Step 1, the calculation of the modular wavelet transform where the input function is approximated as $f(\theta) \approx \Sigma_A g_A \psi_A(\theta)$, and a basic Step 2, substitution of known expressions for the Fourier coefficients of the modular wavelets; these two steps are again conveniently merged into a binary cascade of arrow-structures in practice.

To elucidate Step 1 for modular wavelets, refer again to FIG. 4 for the notation near the arithmetic arrow labeled by the matrix A. The single value of the input function $f(\theta_0)$ together with the ongoing calculation of the updated trigonometric function $\alpha \cos\theta + \beta \sin\theta + \gamma$ in the arrow-structure this time uniquely determines the modular wavelet coefficient $$g_A = \frac{f(\theta_0) - (\alpha\cos\theta_0 + \beta\sin\theta_0 + \gamma)}{\psi_A(\theta_0)}$$

since $\psi_B(\theta_0)=0$ for every labeling matrix B of generation greater than A; there is thus no need for regularization with modular wavelets.

As to Step 2, recall that a basis of modular wavelets was given before by a collection $\psi_B(\theta)$ of wavelets where A is the label on an arithmetic arrow and either B=A or B=SA. In each case, one can calculate that $\psi_B(\theta)$ has Fourier expansion $$\psi_B(\theta) \sim d_0^B + d_1^B e^{i\theta} + d_{-1}^B e^{-i\theta} + \frac{i}{2\pi}\sum_{|n|>1}\frac{e^{in\theta}}{n^3-n}[x_n^B + n\, y_n^B + n^2\, z_n^B]:$$

where $$x_n^B = \begin{cases} 2(c^2+d^2)\left[\left(\frac{d-ic}{d+ic}\right)^n - \left(\frac{b-ia}{b+ia}\right)^n\right]; & \text{if } B=A, \\ 2(a^2+b^2)\left[\left(\frac{b-ia}{b+ia}\right)^n - \left(\frac{d-ic}{d+ic}\right)^n\right]; & \text{if } B=SA, \end{cases}$$

$$y_n^B = \begin{cases} -4i\frac{(ac+bd)}{a^2+b^2}\left(\frac{b-ia}{b+ia}\right)^n; & \text{if } B=A, \\ 4i\frac{(ac+bd)}{c^2+d^2}\left(\frac{d-ic}{d+ic}\right)^n; & \text{if } B=SA, \end{cases}$$

$$y_n^B = \begin{cases} \frac{4}{a^2+b^2}\left(\frac{b-ia}{b+ia}\right)^n; & \text{if } B=A, \\ \frac{4}{c^2+d^2}\left(\frac{d-ic}{d+ic}\right)^n; & \text{if } B=SA, \end{cases}$$

and $$2\pi d_0^B = \begin{cases} 4\frac{ac+bd}{a^2+b^2} + 2(c^2+d^2)\left[\tan^{-1}\frac{2ab}{b^2-a^2} - \tan^{-1}\frac{2cd}{d^2-c^2}\right]; & \text{if } B=A, \\ -4\frac{ac+bd}{c^2+d^2} - 2(a^2+b^2)\left[\tan^{-1}\frac{2ab}{b^2-a^2} - \tan^{-1}\frac{2cd}{d^2-c^2}\right]; & \text{if } B=SA, \end{cases}$$

$$2\pi d_{-1}^B =$$

$$2\pi d_0^B = \begin{cases} -2\frac{ac+bd+2i}{(b+ia)^2} + (c+id)^2\left[\tan^{-1}\frac{2ab}{b^2-a^2} - \tan^{-1}\frac{2cd}{d^2-c^2}\right]; & \text{if } B=A, \\ 2\frac{ac+bd-2i}{(d+ia)^2} + (a+ib)^2\left[\tan^{-1}\frac{2ab}{b^2-a^2} - \tan^{-1}\frac{2cd}{d^2-c^2}\right]; & \text{if } B=SA, \end{cases}$$

Thus, the method of calculating Fourier transforms using modular wavelets is easily derived from the method using arithmetic wavelets. In fact, it is a simple matter to incorporate the two minor modifications just described and alter the included source code employing arithmetic wavelets to produce source code employing modular wavelets.

In the same way for fan wavelets, there is again a Step 1 and Step 2, which are merged into a binary cascade of arrow-structures. As for arithmetic wavelets, Step 1 for fan wavelets again requires a regularization scheme. As to Step 2, the formulas for Fourier coefficients of fan wavelets can be derived from those given before for modular wavelets using the identity $\phi_A(\theta)=\psi_A(\theta)-\psi_{UA}(\theta)$ mentioned before. Again, the included source code is easily modified to employ fan wavelets.

Flow Charts for the Fourier Transform

Flow charts for various procedures used in the calculation of Fourier transforms are presented in FIGS. 5–8. For definiteness, the flow charts and source code refer to arithmetic wavelets without renormalization, but the renormalizing source code will also be included for completeness. For purposes of brevity in these flow charts, the arrow-structures defined before are referred to in these figures simply as "arrows".

In FIG. 5 is presented a flow chart for the main driving routine. The input data is normalized as indicated in program segment 1. There are separate recursions established in program segments 2 and 3 for the top and bottom of the circle respectively.

Each recursion is established with a call to the subroutine gener, which then calls itself in turn. The Fourier coefficients are stored internally with an overall suppressed factor of $\pi$, and output data normalization of multiplying by $\pi$ is accomplished in program segment 4. Output Fourier coefficients are finally displayed before exiting in program segment 5. Program segments 2 and 3 are entirely independent and could be performed in parallel; more generally, each of program segments 2 and 3 could be decomposed further into multiple parallel procedures.

A flow chart for the main recursive routine gener is given in FIG. 6. The procedure starts with a test in program segment 6 to determine if:
  the argument envy >=NVAN, in which case there have been NVAN consecutive generations of negligible contributions, and
  the argument generation >=MING, in which case there have been a required minimum number of iterations in the recursion.

If both of these inequalities hold, then the procedure passes to program segment 15, where the cascade is terminated and the output data corrected with a call to the subroutine prune.

In the contrary case that the recursion should continue, the procedure passes to program segment 7, where the descendant arrows in the cascade are determined using the least-squares fit to the next generation of data as described before to compute the regularized wavelet coefficients of the descendants. These are combined with integer calculations to update the lagged trigonometric functions. The procedure then passes to program segment 8, where the ongoing approximations to Fourier coefficients are updated to include contributions from the two descendant arrows with a call of the subroutine charles for each descendant. The procedure continues with a test in program segment 9. If the contribution calculated in the subroutine charles for either descendant to any Fourier coefficient in the bandwidth was non-negligible, then the recursive argument envy is set to zero in program segment 10. In the contrary case that both contributions to all Fourier coefficients in the bandwidth were negligible, the control parameter envy is increased by one in program segment 13.

In any case, the procedure passes to program segment 11, where there is a test on the number of generations. In case too many iterations of the recursion have occurred, it is terminated in program segment 12, and suitable warning of non-convergence of the method is written to the output. In the contrary case that the maximum number of generations has not been reached, program segment 14 establishes the recursion by calling gener once for each of the descendant arrows with the updated control parameter envy and an incremented generation.

In FIG. 7 is presented a flow chart for the subroutine charles. Calling the subroutine charles has the effect of updating the ongoing approximations to the Fourier coefficients for a single argument arrow and returning a flag which keeps track of whether any such contribution has been non-negligible. The flag is cleared in program segment 16, and several preliminary calculations are accomplished in program segment 17. The procedure passes to program segment 18, where it is determined whether to calculate the 0,+1, −1 Fourier coefficients. If these are to be calculated, then the procedure passes to program segment 19, which calls a subroutine to update these three Fourier coefficients. Program segments 20 and 21 set the flag as required depending upon whether these three contributions are non-negligible.

In any case, the procedure passes to program segment 22. If the loop over the bandwidth is complete, then all Fourier coefficients have been updated, so the subroutine charles returns the flag in program segment 23. In the contrary case, the current Fourier coefficient is updated in program segment 24. The flag is set as required depending on whether the current contribution was non-negligible in program segments 25 and 26. The iteration over bandwidth is established by the update in program segment 27 and the return to program segment 22.

In FIG. 8 is presented a flow chart for the subroutine prune, which modifies the array of Fourier coefficients when terminating the cascade. The final update of lagged trigonometric functions to produce $\tau_1, \tau_2$ is performed in program segment 28. There is one such function for each possible descendant of the argument arrow. The procedure passes to program segment 29, where further input data is sampled in order to compute two trigonometric extrapolations $\sigma_1, \sigma_2$, one such extrapolation for each possible descendant of the argument arrow. Each function $\sigma_i-\tau_i$, for i=1, 2, is truncated as described before, and the Fourier coefficients of the truncated functions are added to the ongoing approximations of Fourier coefficients in program segment 30. Program segments 31 and 32 implement the calculation of 0,+1,−1 Fourier coefficients if desired, and the subroutine prune is terminated with the return in program segment 33.

The Inverse Fourier Transform

Included in the section entitled "Source Codes" is an implementation in the computer language C of a preferred embodiment of the method described in this section employing arithmetic wavelets.

Since the method for calculating the inverse Fourier transform is similar in spirit and execution to that for the Fourier transform described in detail before, it need only be briefly discussed. The input data includes the specification of a collection of Fourier coefficients $c_n$ in a given bandwidth N.

There are again two main steps in the calculation:

Step 1: Calculate arithmetic wavelet coefficients $e_A$ from the given Fourier coefficients $c_n$.

Step 2: Use the wavelet coefficients from Step 1 and the reconstruction algorithm to output values of the function $\Sigma_A e_A \tilde{\Theta}_A(\theta)$ at the Farey quadrature points on the circle.

For Step 1, there is again an explicit formula from previous theoretical work. Deep mathematical results prove that for $n \neq 0, \pm 1$, $$e^{in\theta} = \cos n\theta + i \sin n\theta$$
$$= -[c_0^n + c_1^n e^{i\theta} + c_{-1}^n e^{-i\theta}] + \frac{i}{4}\Sigma_A \left\{ n(\xi^n + \eta^n) + \frac{\eta + \xi}{\eta - \xi}(\xi^n - \eta^n) \right\} \bar{\partial}_A(\theta),$$

where the sum is over all arithmetic arrows, the underlying chord of which has endpoints $\xi, \eta \in C$, and $$c_0^n = \begin{cases} -1, & n \equiv 0(4); \\ 0, & n \equiv 1(4); \\ -1, & n \equiv 2(4); \\ 0, & n \equiv 3(4); \end{cases} \quad c_1^n = \begin{cases} 0, & n \equiv 0(4); \\ -1, & n \equiv 1(4); \\ i, & n \equiv 2(4); \\ 0 & n \equiv 3(4). \end{cases} \quad c_{-1}^n = \begin{cases} 0, & n \equiv 0(4); \\ 0, & n \equiv 1(4); \\ i, & n \equiv 2(4); \\ -1, & n \equiv 3(4). \end{cases}$$

Substituting this expression for $e^{in\theta}$ into the given Fourier expansion $f(\theta) \sim \Sigma_n c_n e^{in\theta}$ gives $$f(\theta) \approx c_0' + c_1' e^{i\theta} + c_{-1}' e^{-i\theta} + \sum_A e_A \bar{\partial}_A(\theta),$$

where $$e_A = \frac{i}{4} \sum_{n \neq 0, \pm 1} c_n \left\{ n(\xi^n + \eta^n) + \frac{\eta + \xi}{\eta - \xi}(\xi^n - \eta^n) \right\},$$

and $$c_l' = c_l - \sum_{n \neq 0, \pm 1} c_n c_l^n, \text{ for } l = 0, \pm 1.$$

This expression $f(\theta) \approx c_0' + c_1' e^{i\theta} + c_{-1}' e^{-i\theta} + \Sigma_A e_A \tilde{\Theta}_A(\theta)$ of $f(\theta)$ constitutes Step 1 in the calculation of inverse Fourier transform.

In fact, the calculation of wavelet coefficients $e_A$ in Step 1 can be implemented using mostly integer operations to improve run-time dramatically. To see this, notice that the formulas $$\xi = \frac{b + ia}{b - ia}, \eta = \frac{d + ic}{d - ic}$$

for the endpoints of the chord underlying the arrow labeled by the matrix $$A = \begin{pmatrix} a & b \\ c & d \end{pmatrix}$$

may be substituted into the expression for $e_A$ to yield $$e_A = \frac{i}{4} \sum_{n \neq 0, \pm 1} c_n e_A^n,$$

where $$e_A^n = \frac{[(bd - ac) + i(ad + dc)]^n}{(a^2 + b^2)^n (c^2 + d^2)^n} \times$$
$$[n\{(bd + ac + i)^n + (bd + ac - i)^n\} +$$
$$i(bd + ac)\{(bd + ac + i)^n - (bd + ac - i)^n\}].$$

In the obvious implementation of this formula to calculate $e_A^n$ using integer operations, the intermediary integer expressions grow too large to be practical for n large if the arrow corresponding to A is of large generation.

This difficulty is overcome by wavelet renormalization, where these attendant large integer calculations are obviated entirely as is illustrated in the included source code.

Step 2 in the method for calculating inverse Fourier transforms depends upon the reconstruction algorithm to output function values on the circle taken by the linear combination $f(\theta) \approx c_0' + c_1' e^{i\theta} + c_{-1}' e^{-i\theta} + \sigma_A e_A \tilde{\Theta}_A(\theta)$. The finiteness property of the reconstruction algorithm allows the exact calculation of these function values at the sample points $Q \subseteq C$ in their ordering determined by the Farey quadrature. The two steps are again conveniently merged into a single binary cascade as follows.

There is only one control parameter, which is called SCALE, where the method is required to determine at least one output value in each circular arc subtending an angle SCALE. Thus, as SCALE is decreased the grid of output values on the circle is refined. A binary cascade is established using arrow-structures which is similar to that for the Fourier transform before. However, the wavelet coefficients are given in this case in closed form by the formula for $e_A$ (so no least-squares fit is required). Because of the finiteness property of the reconstruction algorithm, exact output values are determined at each stage of the recursion. The cascade is terminated with an arrow whenever the chords underlying both descendant arrows subtend angles less than SCALE. Output data can be written to an array either when calculated to store data in the ordering of the Farey quadrature or when terminating the cascade to store data in the standard ordering on the circle. Furthermore, the terminal arrow-structures could be stored for restart or iterative refinement capabilities.

This completes the description of the implementation of the method of calculating the inverse Fourier transform using arithmetic wavelets.

Several points will next be addressed which allow the extension of the methods to modular and fan wavelets. Again there is a basic Step 1, the calculation of wavelet coefficients from Fourier coefficients, and a Step 2, the reconstruction algorithm; in each case of fan or modular wavelets, these two steps are again conveniently merged into a binary cascade of arrow-structures in practice. The finiteness condition on fan or modular wavelets mentioned before renders Step 2 entirely analogous to that for arithmetic wavelets. As to Step 1, simply substitute the identities $\tilde{\Theta}_A = \phi_A - \phi_{UA} = \psi_{UA} - 2\psi_A + \psi_{U^{-1}A}$ described before into the expression above for $e^{in\theta}$ in terms of arithmetic wavelets to immediately derive corresponding expressions in terms of fan and modular wavelets.

Thus, the method of calculating inverse Fourier transforms using fan or modular wavelets is easily derived from the method using arithmetic wavelets. In fact, it is a simple matter to incorporate the minor modifications just described and alter the included source code employing arithmetic wavelets to produce source code employing fan or modular wavelets.

Flow Charts for the Inverse Fourier Transform

Flow charts for various procedures used in the calculation of inverse Fourier transforms are presented in FIGS. 9–10. For definiteness, the flow charts and source code refer to arithmetic wavelets without renormalization, but the renormalizing source code will also be included for completeness. For purposes of brevity in these flow charts, the arrow-structures defined before are referred to in these figures simply as "arrows".

In FIG. 9 is given a flow chart for the main driving routine. Modified Fourier coefficients $c'_0, c'_1, c'_{-1}$ are computed in program segment 34. The formula given in Step 1 for the inverse Fourier transform is applied in program segment 35 to calculate the arithmetic wavelet coefficients in terms of Fourier coefficients for a particular family of nine arrows. These nine arithmetic wavelet coefficients are required to initialize the trigonometric functions for recursions established in program segment 36 with calls to the recursive subroutine gener. Recursions with initial conditions corresponding to $A=U,T^{-2}, U^{-1},T^{-1},T^{-1}U^{-1}, U^{-2}$ are undertaken in program segment 36. These recursions, as well as further possible subrecursions derived from them, are independent and may be undertaken in parallel. This elaborate driving routine is convenient because $e^{in\theta}$ is expressed in Step 1 of the inverse Fourier transform method in terms of the normalized arithmetic wavelets $\tilde{\Theta}_A$ which differ from the arithmetic wavelets $\tilde{\Theta}_A$ themselves only for $A=U^{-1}, T^{-1}$.

The procedure passes to program segment 37 to perform an overall correction of the function values using the modified Fourier coefficients $c'_0, c'_1, c'_{-1}$. Output data is displayed and the procedure terminated in program segment 38.

In FIG. 10 is given a flow chart for the main recursive routine gener. In the cascade, the two descendant arrows of the argument arrow are generated in program segment 39 employing Step 1 of the inverse Fourier transform method to calculate the wavelet coefficients of the descendants. These expressions are then used to update the lagged trigonometric functions in program segment 39. A test is performed in program segment 40 to determine if the chord underlying each descendant arrow subtends a sufficiently small angle, as estimated by the comparison of an integer quantity with SCAT; the relation with the control parameter SCALE discussed before is given by SCAT=[exp sinh$^{-1}$(1/SCALE)]$^2$. In case one of the chords subtends too large an angle, the procedure passes to program segment 41. The recursion is established in program segment 41 with two calls to gener, where the arguments are given by the two current descendant arrows. In the contrary case, the procedure performs the final update of the lagged trigonometric functions in program segment 42, then stuffs the output array with the new function values in program segment 43, and finally returns in program segment 44.

Data Compression

As with any method for data compression based on transform coding, five basic manipulation are required, namely:
wavelet filtering,
quantization,
storage and retrieval or transmission
de-quantization, and
reconstruction.

The wavelet filter has already been fully disclosed as Step 1 for the calculation of the Fourier transform, and the wavelet inverse filter or reconstruction algorithm has likewise already been described as Step 2 for the calculation of the inverse Fourier transform. Application-specific quantization is done according to psychovisual or psychoacoustic thresholds. Quantization and storage are furthermore merged with wavelet filtering into a single binary cascade as before, and retrieval or transmission are likewise merged with reconstruction into another single binary cascade. The reconstruction algorithm is exact. Furthermore, source code for it may be transmitted along with compressed data since the coding is sufficiently abbreviated and low-level.

As is well-known, useful compression by transform coding requires an efficient specification of the basis elements. This is especially advantageous for the new wavelets: a top arrow of generation g labeled by the two-by-two integral matrix A is specified by g bits, namely, by writing A uniquely as the matrix product of factors U or T. For example, the matrix $$A = \begin{pmatrix} 13 & 9 \\ 10 & 7 \end{pmatrix}$$

factors as $$\begin{pmatrix} 13 & 9 \\ 10 & 7 \end{pmatrix} = \begin{pmatrix} 1 & 1 \\ 0 & 1 \end{pmatrix}\begin{pmatrix} 1 & 0 \\ 3 & 1 \end{pmatrix}\begin{pmatrix} 1 & 2 \\ 0 & 1 \end{pmatrix}\begin{pmatrix} 1 & 0 \\ 1 & 1 \end{pmatrix},$$

so the coefficient for the wavelet $\tilde{\Theta}_A$ is coded by the binary sequence TUUUTTU.

The method is also especially well-suited to progressive picture build-up or other iterative refinement as follows. The Farey quadrature determines a linear ordering on the set Q of quadrature points in the circle C as before. The ordered subset $Q\backslash\{-i, \pm 1\} \subseteq Q \subseteq C$ is put into bijective correspondence with the collection of all arithmetic arrows (where \0 denotes the set-theoretic relative complement); as illustrated in FIGS. 1a–1c, the arithmetic arrow labeled by $$A = \begin{pmatrix} a & b \\ c & d \end{pmatrix}$$

corresponds to the complex number $$\begin{cases} \frac{(b+d)+i(a+c)}{(b+d)-i(a+c)} \epsilon C, & \text{for a top arrow;} \\ \frac{(b-d)+i(a-c)}{(b-d)-i(a-c)} \epsilon C, & \text{for a bottom arrow;} \\ i \epsilon C, & \text{for the doe.} \end{cases}$$

Thus, the ordering from the Farey quadrature on $Q\backslash\{-i, \pm1\}$ determines a corresponding ordering on the set of all arithmetic wavelets. Storage, retrieval, transmission, and reconstruction of wavelet coefficients is accomplished at a specified input or output data resolution in this canonical ordering since energy compacts to the lesser wavelet coefficients. In the case of real-time compression and transmission or other manipulation not requiring retrieval, the method can be further improved by the manipulation of previously computed wavelet coefficients in parallel with the calculation of subsequent ones.

Complex and Multi-Dimensional Data

There is nothing remarkable about the extension of the invention to complex-valued input data $f(\theta)=u(\theta)+i\,v(\theta)$, where u and v are real-valued functions on the circle C. Concentrating for definiteness on arithmetic wavelets, one simple approach is to separately and independently transform u and v, $$u(\theta) \approx \Sigma e_A \tilde{\Theta}_A(\theta) \text{ and } v(\theta) \approx \Sigma f_A \tilde{\Theta}_A(\theta),$$

using the techniques already described in order to calculate $$f(\theta) \approx \Sigma(e_A + if_A)\tilde{\Theta}_A(\theta).$$

Another direct approach is to allow complex values for the input function f and solve for complex wavelet coefficients using the same algebraic formulas as before.

Turning now to multi-dimensional input/output data, suppose that there are $R \geq 1$ input functions each of which has $M \geq 1$ independent variables, and define the torus $C^M$ to be the M-fold Cartesian product $$C^M = \underbrace{C \times \cdots \times C}_{M \text{ times}}.$$

Coordinates on $C^M$ are given by M-tuples $\vec{\theta}=(\theta_1, \theta_2, \ldots, \theta_M)$ of angles, and the input data is specified by an R-tuple of multivariable real- or complex-valued functions $$F(\vec{\theta})=(f^1(\vec{\theta}), f^2(\vec{\theta}), \ldots, f^R(\vec{\theta})),$$

Using the bijection described in the previous section on data compression, each quadrature point $Z \in Q\backslash\{-i, \pm1\}$ uniquely determines a corresponding arithmetic wavelet $\tilde{\Theta}_Z(\theta)$; by convention, one also defines $\tilde{\Theta}_{-i}(\theta)=\tilde{\Theta}_{\pm1}(\theta)=1$. Concentrating on arithmetic wavelets for definiteness, define the corresponding multiwavelet $$\tilde{\Theta}_{\vec{Z}}(\vec{\theta})=\tilde{\Theta}_{Z_1}(\theta_1)\tilde{\Theta}_{Z_2}(\theta_2)\ldots\tilde{\Theta}_{Z_M}(\theta_M)$$

As before, the input function F must be normalized. To this end, define a trigonometric monomial to be a product of the form $X^1(\theta_1)X^2(\theta_2)\ldots X^M(\theta_M)$, where each $X^i(\theta)$ is given by one of $X^i(\theta)=\cos\theta$, $X^1(\theta)=\sin\theta$, or $X^1(\theta)=1$. The values of F at the points in $\{-i\pm1\}^M$ uniquely determine coefficients in a linear combination $v(\theta)$ of trigonometric monomials so that $v(\vec{\theta})=F(\vec{\theta})$ for each point of $\{-i, _1\}M$. Just as in the one-dimensional wavelet filter already discussed, now one must consider the normalization $F(\theta)=F(\vec{\theta})-v(\vec{\theta})$, so F is zero at each point of $+I+\}M$ Adopting the Farey quadrature in each factor circle C of the torus $C^M$, there is an induced lexicographic ordering on the set $Q^M\backslash\{-i,\pm1\}^M \tilde{\Theta}C^M$ of potential sample points $\vec{Z} \in C^M$. One separately approximates each coordinate function $$f^i(\vec{\theta}) \approx \Sigma e_{\vec{Z}}^i \tilde{\Theta}_{\vec{Z}}(\vec{\theta}), \text{ for } i=1, 2, \ldots, R,$$

of $F(\vec{\theta})$ as a finite linear combination of multiwavelets with application-specific zonal sampling for optimum energy compaction; this calculation may employ least-squares or other regularization in each factor as well as renormalization as for the one-dimensional wavelet filter. The methods are again elegantly implemented in practice as M nested binary cascades. The final processing for the cascades of arrow-structures in the calculation of multi-dimensional Fourier transforms may involve adding suitable linear combinations of trigonometric monomials based on further sampling, or one may simply truncate with no final processing at all, as in the one-dimensional case.

These same remarks apply verbatim to fan and modular wavelets.

Mathematical Basis

"The decorated Teichmüller space of punctured surfaces", Communications in Mathematical Physics 13, pp. 299–339 (1987), written by the author of this patent application, began the study of certain abstract geometric coordinates called lambda lengths in the context of hypetbolic geometry on Riemann surfaces. The ideas developed in this and other related papers have found applications in high energy physics. A more recent publication in this series of about 20 papers is entitled "Universal constructions in Teichmüller Theory", Advances in Mathematics 98, pp. 143–215 (1993). Here it was shown how to generalize lambda lengths to provide coordinates on a certain space of homeomorphisms (i.e. continuous bijections whose inverses are also continuous) of the circle, where there is one generalized lambda length for each arithmetic arrow. In further recent work described in "The Lie algebra of homeomorphisms of the circle", *Advances in Mathematics* 140, pp. 282–322 (1998), written jointly with Feodor Malikov, there is described a representation of the coordinate deformations of these generalized lambda lengths as explicit vector fields on the circle. These vector fields are called "normalized elementary vector fields", and their study led to other vector fields on the circle called "fans" and "hyperfans". These three families of vector fields correspond, respectively, to the arithmetic, fan, and modular wavelets described here via the identification of the vector field $$f(\theta)\frac{\partial}{\partial\theta}$$

with the function $f(\theta)$; there was, however, no discussion of wavelets, sampling of data, approximation of functions, or any algorithms in the published literature.

Each arithmetic wavelet is once-continuously differentiable on the circle, compactly supported, and localized in space. Arithmetic wavelets are not compactly supported in frequency, but instead, the frequency profile of an arithmetic wavelet is given algebraically by the formula for $c_n^A$ used in Step 2 in the calculation of Fourier transforms; a non-compactly supported localization in frequency follows directly from this. The asserted formula for $c_n^A$ can be derived without much difficulty but in several cases directly from FIGS. 3a–3e integrating twice by parts the usual expression for Fourier coefficients using the fact $\tilde{\Theta}_A$ is once-continuously differentiable. More difficult to derive is the formula given for the exponential functions $e^{in\theta}$ in terms of arithmetic wavelets which was used in Step 1 of the calculation of inverse Fourier transforms; this subtle computation with lambda lengths is given in "The Lie algebra of homeomorphisms of the circle".

Similar remarks apply to fan and modular wavelets, but fan wavelets are only continuous (they are not differentiable), and modular wavelets are not even continuous.

In order to explain the failure of orthonormality of arithmetic wavelets and illuminate the regularization used in the arithmetic wavelet filter, fix some matrix A labeling an arithmetic arrow whose underlying chord has initial point q in the circle C. The sequence $U^nA$ of matrices label the arithmetic arrows whose underlying chords also have q as initial point, where n denotes an arbitrary integer. There is one infinite linear dependence $$0 = \sum_n \tilde{\partial}_{U^nA}.$$

for each q E Q, and this explains the additive degree of freedom in the calculation of $e_{UA}$ and $e_{TA}$ in the wavelet filter which is handled by regularization as was discussed before. This additive degree of freedom is also manifest in the initial specification $e_I=0$ of wavelet coefficient on the doe in the wavelet filter.

In order to better understand the Farey quadrature, it is convenient to transform the disk D to the upper half-plane $U=\{u+iv:v>0\}$ by means of the transform $$K: D \to U$$
$$z \mapsto i\frac{z+1}{z-1}.$$

This function K is a homeomorphism on the interior of D which maps the unit circle C bijectively to the real-axis $\{u+iv:v=0\}$ together with an additional point $\infty$ at infinity, where $K(-1)=0$, $K(-i)=1$, and $K(+1)=\infty$. Furthermore, as q $\in$ Q varies over all quadrature points, the real number K(q) varies over all rational numbers, where the rational number $$\frac{p}{q}$$

corresponds to the quadrature point $$\frac{p-iq}{p+iq} \in Q.$$

In order to illustrate the Farey tesselation itself in U, whenever $q_1$, $q_2 \in Q$ are the endpoints of the chord underlying an arithmetic arrow in D, draw the semi-circle in U with real endpoints $q_1$, $q_2$; in the degenerate case that one of the quadrature points is infinite, say the point $q_2=00$, then draw the vertical ray in U with endpoint $q_1$. Applying this procedure to each arithmetic arrow produces the classical model of the Farey tesselation in U that is indicated in FIG. 11. This figure illustrates the relationship between the Farey tesselation and the indicated circle packing, where the circle in the figure that is tangent to the real-axis at the rational point p/q has diameter $q^{-2}$. For further information on number-theoretic aspects of this classical figure, see, for instance, Ford's book "Automorphic Functions", Chelsea (1972).

Source Codes

In order to adequately disclose the methods, it is the purpose of this paragraph to include source codes for their implementations in the computer language C. Source code is presented for each of the following two implementations.

awft is the implementation of a preferred embodiment of the method for computing the Fourier transform of real-valued input data defined on the circle. The algorithm depends upon a bandwidth N, tolerance EPS, generation cut-off NVAN, and minimum generation MING as described before. A further flag SMODE=1 determines that the output data will include the 0,+1,−1 Fourier coefficients, and SMODE=0 otherwise. (The only configuration in either code which requires any library routines is SMODE=1, which requires math.h.)

awift is the implementation of a preferred embodiment of the method for computing the inverse Fourier transform of specified complex-valued Fourier coefficients defined in a specified bandwidth N. The output data is controlled by a single parameter SCAT, which is related to the parameter SCALE discussed before by SCAT= [exp sinh ^(−1)(1/SCALE)] ^2. (SCAT varies inversely with SCALE and may be compared with conveniently derived approximate quantities.)

The comparison of the subroutines tgener in awft and in awift illustrates the easy transition between source codes for real and for complex data. The corresponding complex-awft and real-awift are therefore easily derived from the included source codes.

Furthermore, the method for compression of one-dimensional input data amounts to the first step of awft, then quantization/de-quantization, then the second step of awift. The included source codes together thus also implement the method for compression of one-dimensional data since source code for it may be extracted from the included source codes. Finally, it is straight-forward to write the further driving routine required for multi-dimensional data compression, so the source codes included with this patent application are sufficient to readily implement the method for multi-dimensional data compression as well.

The included implementations have not been optimized. (For instance, straight-forward optimization has improved run-time by as much as 70% over the included awft code; on the other hand, optimization destroys intelligibility of the coding in relation to the underlying algorithm, and this explains the inclusion of unoptimized source code.) Another substantial improvement in run-time over the included source codes can be achieved by factoring so as to replace various manipulations of complex numbers with manipulations of integers as discussed before.

Moreover, for clarity, the included source codes do not take advantage of renormalization, but for completeness, to each of awft and awift is appended source code to replace the subroutines tgener and bgener by corresponding subroutines which do employ renormalization.

I claim:

1. A method of compressing and reconstructing input data comprising the steps of:
   providing input data in an initial form;
   sampling the input data at the points of a Farey quadrature;
   transforming the Farey-sampled data into an intermediate form;
   quantizing the Farey-sampled data while in the intermediate form;
   using the quantized intermediate form to store or transmit the Farey-sampled data;
   de-quantizing the quantized intermediate form of the Farey-sampled data prior to reconstructing the data; and
   reconstructing the intermediate form of the Farey-sampled data in order to obtain reconstructed data for use.

2. A method as recited in claim 1 wherein:
   the step of transforming the Farey-sampled data into an intermediate form is achieved via a wavelet transformation; and
   the intermediate form of the Farey-sampled data takes the form of wavelet coefficients.

3. A method as recited in claim 2 wherein the wavelet transformation is based on arithmetic wavelets.

4. A method as recited in claim 3 wherein the arithmetic wavelets are defined in accordance with the following expressions:

$$\bar{\partial}_I(\theta) = \begin{cases} +2\cos\theta + 2\sin\theta - 2; & \text{if } 0 \leq \theta \leq \frac{\pi}{2}, \\ +2\cos\theta - 2\sin\theta + 2; & \text{if } \frac{\pi}{2} \leq \theta \leq \pi, \\ -2\cos\theta - 2\sin\theta - 2; & \text{if } \pi \leq \theta \leq \frac{3\pi}{2}, \\ -2\cos\theta + 2\sin\theta + 2; & \text{if } \frac{3\pi}{2} \leq \theta \leq 2\pi; \end{cases}$$

and if $$A = \begin{pmatrix} a & b \\ c & d \end{pmatrix} \neq \begin{pmatrix} 1 & 0 \\ 0 & 1 \end{pmatrix} = I$$

labels an arithmetic arrow;
and if A labels a top arithmetic arrow and a>c, then $$\bar{\partial}_A(\theta) = \begin{cases} +4(d^2-c^2)\cos\theta + 8cd\sin\theta - 4(d^2+c^2); & \text{if } \tan^{-1}\frac{2cd}{d^2-c^2} \leq \theta \leq \tan^{-1}\frac{2(b+d)(a+c)}{(b+d)^2-(a+c)^2}, \\ +2(a^2+d^2-b^2-c^2+2ac-2bd)\cos\theta & \text{if } \tan^{-1}\frac{2(b+d)(a+c)}{(b+d)^2-(a+c)^2} \leq \theta \leq \tan^{-1}\frac{2ba}{b^2-a^2}, \\ +4(cd-ab-bc-ad)\sin\theta \\ +2(a^2+b^2-c^2-d^2+2ac+2bd); \\ +2(b^2+d^2-a^2-c^2+2ac-2bd)\cos\theta & \text{if } \tan^{-1}\frac{2ba}{b^2-a^2} \leq \theta \leq \tan^{-1}\frac{2(d-b)(c-a)}{(d-b)^2-(c-a)^2}, \\ +4(ab+cd-ad-bc)\sin\theta \\ +2(-a^2-b^2-c^2-d^2+2ac+2bd); \\ 0; & \text{otherwise}; \end{cases}$$

and if A labels a top arithmetic arrow and c≧a, then $$\bar{\partial}_A(\theta) = \begin{cases} +2(a^2+c^2-b^2-d^2-2ac+2bd)\cos\theta & \text{if } \tan^{-1}\frac{2(d-b)(c-a)}{(d-b)^2-(c-a)^2} \leq \theta \leq \tan^{-1}\frac{2cd}{d^2-c^2}, \\ +4(ad+bc-ab-cd)\sin\theta \\ +2(a^2+b^2+c^2+d^2-2ac-2bd); \\ +2(a^2+d^2-b^2-c^2+2bd-2ac)\cos\theta & \text{if } \tan^{-1}\frac{2cd}{d^2-c^2} \leq \theta \leq \tan^{-1}\frac{2(b+d)(a+c)}{(b+d)^2-(a+c)^2}, \\ +4(ad+bc+cd-ab)\sin\theta \\ +2(a^2+b^2-c^2-d^2-2bd-2ac); \\ +4(a^2-b^2)\cos\theta - 8ab\sin\theta + 4(a^2+b^2); & \text{if } \tan^{-1}\frac{2(b+d)(a+c)}{(b+d)^2-(a+c)^2} \leq \theta \leq \tan^{-1}\frac{2ba}{b^2-a^2}, \\ 0; & \text{otherwise}; \end{cases}$$

and if A labels a bottom arithmetic arrow and a>−c, then $$\bar{\partial}_A(\theta) = \begin{cases} \begin{aligned} &+2(a^2+c^2-b^2-d^2+2ac-2bd)\cos\theta \\ &+4(-ad-bc-ab-cd)\sin\theta \\ &+2(a^2+b^2+c^2+d^2+2ac+2bd); \end{aligned} & \text{if } \tan^{-1}\frac{2(b+d)(a+c)}{(b+d)^2-(a+c)^2} \le \theta \le \tan^{-1}\frac{2ba}{b^2-a^2}, \\ \begin{aligned} &+2(b^2+c^2-a^2-d^2+2ac-2bd)\cos\theta \\ &+4(ab-ad-bc-cd)\sin\theta \\ &+2(c^2+d^2-a^2-b^2+2ac+2bd); \end{aligned} & \text{if } \tan^{-1}\frac{2ba}{b^2-a^2} \le \theta \le \tan^{-1}\frac{2(d-b)(c-a)}{(d-b)^2-(c-a)^2}, \\ +4(c^2-d^2)\cos\theta-8cd\sin\theta+4(c^2+d^2); & \text{if } \tan^{-1}\frac{2(d-b)(c-a)}{(d-b)^2-(c-a)^2} \le \theta \le \tan^{-1}\frac{2cd}{d^2-c^2}, \\ 0; & \text{otherwise;} \end{cases}$$

and if A labels a bottom arithmetic arrow and −c≧a, then $$\bar{\partial}_A(\theta) = \begin{cases} +4(b^2-a^2)\cos\theta+8ab\sin\theta-4(a^2+b^2); & \text{if } \tan^{-1}\frac{2ba}{b^2-a^2} \le \theta \le \tan^{-1}\frac{2(d-b)(c-a)}{(d-b)^2-(c-a)^2}, \\ \begin{aligned} &+2(b^2+c^2-a^2-d^2+2bd-2ac)\cos\theta \\ &+4(ad+bc+ab-cd)\sin\theta \\ &+2(c^2+d^2-a^2-b^2-2ac-2bd); \end{aligned} & \text{if } \tan^{-1}\frac{2(d-b)(c-a)}{(d-b)^2-(c-a)^2} \le \theta \le \tan^{-1}\frac{2cd}{d^2-c^2}, \\ \begin{aligned} &+2(b^2+d^2-a^2-c^2+2bd-2ac)\cos\theta \\ &+4(ad+bc+cd+ab)\sin\theta \\ &+2(-a^2-b^2-c^2-d^2-2ac-2bd); \end{aligned} & \text{if } \tan^{-1}\frac{2cd}{d^2-c^2} \le \theta \le \tan^{-1}\frac{2(b+d)(a+c)}{(b+d)^2-(a+c)^2}, \\ 0; & \text{otherwise.} \end{cases}$$

5. A method as recited in claim 2 wherein the wavelet transformation is based on modular wavelets.

6. A method as recited in claim 5 wherein the modular wavelets are defined in accordance with the following expressions:

$$\psi_A(\theta) = \sum_{n\ge 0} n\bar{\partial}_{U^n A}(\theta),$$

$$\psi_{SA}(\theta) = \sum_{n\ge 0} n\bar{\partial}_{T^{-n} A}(\theta),$$

where $$\bar{\partial}_A(\theta) = \begin{cases} \bar{\partial}_A(\theta); & \text{if } A \ne U^{-1}, T^{-1}, \\ \bar{\partial}_{U^{-1}}(\theta) - 2\sin\theta; & \text{if } A = U^{-1}, \\ \bar{\partial}_{T^{-1}}(\theta) + 2\sin\theta; & \text{if } A = T^{-1}, \end{cases}$$

-continued with $S = \begin{pmatrix} 0 & -1 \\ 1 & 0 \end{pmatrix}$, $U = \begin{pmatrix} 1 & 0 \\ 1 & 1 \end{pmatrix}$, and $T = \begin{pmatrix} 1 & 1 \\ 0 & -1 \end{pmatrix}$; and $$\bar{\partial}_I(\theta) = \begin{cases} +2\cos\theta+2\sin\theta-2; & \text{if } 0 \le \theta \le \frac{\pi}{2}, \\ +2\cos\theta-2\sin\theta+2; & \text{if } \frac{\pi}{2} \le \theta \le \pi, \\ -2\cos\theta-2\sin\theta-2; & \text{if } \pi \le \theta \le \frac{3\pi}{2}, \\ -2\cos\theta+2\sin\theta+2; & \text{if } \frac{3\pi}{2} \le \theta \le 2\pi; \end{cases}$$

and if $$A = \begin{pmatrix} a & b \\ c & d \end{pmatrix} \ne \begin{pmatrix} 1 & 0 \\ 0 & 1 \end{pmatrix} = I$$

and if labels an arithmetric arrow;

and if A labels a top arithmetic arrow and a>c, then $$\bar{\partial}_A(\theta) = \begin{cases} +4(d^2-c^2)\cos\theta + 8cd\sin\theta - 4(d^2+c^2); & \text{if } \tan^{-1}\dfrac{2cd}{d^2-c^2} \le \theta \le \tan^{-1}\dfrac{2(b+d)(a+c)}{(b+d)^2-(a+c)^2}, \\ +2(a^2+d^2-b^2-c^2+2ac-2bd)\cos\theta & \text{if } \tan^{-1}\dfrac{2(b+d)(a+c)}{(b+d)^2-(a+c)^2} \le \theta \le \tan^{-1}\dfrac{2ba}{b^2-a^2}, \\ +4(cd-ab-bc-ad)\sin\theta \\ +2(a^2+b^2-c^2-d^2+2ac+2bd); \\ +2(b^2+d^2-a^2-c^2+2ac-2bd)\cos\theta & \text{if } \tan^{-1}\dfrac{2ba}{b^2-a^2} \le \theta \le \tan^{-1}\dfrac{2(d-b)(c-a)}{(d-b)^2-(c-a)^2}, \\ +4(ab+cd-ad-bc)\sin\theta \\ +2(-a^2-b^2-c^2-d^2+2ac+2bd); \\ 0; & \text{otherwise;} \end{cases}$$

and if A labels a top arithmetic arrow and c≧a, then $$\bar{\partial}_A(\theta) = \begin{cases} +2(a^2+c^2-b^2-d^2-2ac+2bd)\cos\theta & \text{if } \tan^{-1}\dfrac{2(d-b)(c-a)}{(d-b)^2-(c-a)^2} \le \theta \le \tan^{-1}\dfrac{2cd}{d^2-c^2}, \\ +4(ad+bc-ab-cd)\sin\theta \\ +2(a^2+b^2+c^2+d^2-2ac-2bd); \\ +2(a^2+d^2-b^2-c^2+2bd-2ac)\cos\theta & \text{if } \tan^{-1}\dfrac{2cd}{d^2-c^2} \le \theta \le \tan^{-1}\dfrac{2(b+d)(a+c)}{(b+d)^2-(a+c)^2}, \\ +4(ad+bc+cd-ab)\sin\theta \\ +2(a^2+b^2-c^2-d^2-2bd-2ac); \\ +4(a^2-b^2)\cos\theta - 8ab\sin\theta + 4(a^2+b^2); & \text{if } \tan^{-1}\dfrac{2(b+d)(a+c)}{(b+d)^2-(a+c)^2} \le \theta \le \tan^{-1}\dfrac{2ab}{b^2-a^2}, \\ 0; & \text{otherwise;} \end{cases}$$

and if A labels a bottom arithmetic arrow and a>−c, then $$\bar{\partial}_A(\theta) = \begin{cases} +2(a^2+c^2-b^2-d^2+2ac-2bd)\cos\theta & \text{if } \tan^{-1}\dfrac{2(b+d)(a+c)}{(b+d)^2-(a+c)^2} \le \theta \le \tan^{-1}\dfrac{2ba}{b^2-a^2}, \\ +4(-ad-bc-ab-cd)\sin\theta \\ +2(a^2+b^2+c^2+d^2+2ac+2bd); \\ +2(b^2+c^2-a^2-d^2+2ac-2bd)\cos\theta & \text{if } \tan^{-1}\dfrac{2ba}{b^2-a^2} \le \theta \le \tan^{-1}\dfrac{2(d-b)(c-a)}{(d-b)^2-(c-a)^2}, \\ +4(ab-ad-bc-cd)\sin\theta \\ +2(c^2+d^2-a^2-b^2+2ac+2bd); \\ +4(c^2-d^2)\cos\theta - 8cd\sin\theta + 4(c^2+d^2); & \text{if } \tan^{-1}\dfrac{2(d-b)(c-a)}{(d-b)^2-(c-a)^2} \le \theta \le \tan^{-1}\dfrac{2cd}{d^2-c^2}, \\ 0; & \text{otherwise;} \end{cases}$$

and if A labels a bottom arithmetic arrow and −c≧a, then $$\bar{\partial}_A(\theta) = \begin{cases} +4(b^2-a^2)\cos\theta + 8ab\sin\theta - 4(a^2+b^2); & \text{if } \tan^{-1}\dfrac{2ba}{b^2-a^2} \le \theta \le \tan^{-1}\dfrac{2(d-b)(c-a)}{(d-b)^2-(c-a)^2}, \\ +2(b^2+c^2-a^2-d^2+2bd-2ac)\cos\theta & \text{if } \tan^{-1}\dfrac{2(d-b)(c-a)}{(d-b)^2-(c-a)^2} \le \theta \le \tan^{-1}\dfrac{2cd}{d^2-c^2}, \\ +4(ad+bc+ab-cd)\sin\theta \\ +2(c^2+d^2-a^2-b^2-2ac-2bd); \\ +2(b^2+d^2-a^2-c^2+2bd-2ac)\cos\theta & \text{if } \tan^{-1}\dfrac{2cd}{d^2-c^2} \le \theta \le \tan^{-1}\dfrac{2(b+d)(a+c)}{(b+d)^2-(a+c)^2}, \\ +4(ad+bc+cd+ab)\sin\theta \\ +2(-a^2-b^2-c^2+2ac+2bd); \\ 0; & \text{otherwise.} \end{cases}$$

7. A method as recited in claim 2 wherein the wavelet transformation is based on fan wavelets.

8. A method as recited in claim 7 wherein the fan wavelets are defined in accordance with the following expressions:

$$\phi_A(\theta) = \sum_{n \geq 0} \bar{\partial}_{U^n A}(\theta),$$

$$\phi_{SA}(\theta) = \sum_{n \geq 0} \bar{\partial}_{T^{-n} A}(\theta),$$

where $$\bar{\partial}_A(\theta) = \begin{cases} \bar{\partial}_A(\theta); & \text{if } A \neq U^{-1}, T^{-1}, \\ \bar{\partial}_{U^{-1}}(\theta) - 2\sin\theta; & \text{if } A = U^{-1}, \\ \bar{\partial}_{T^{-1}}(\theta) + 2\sin\theta; & \text{if } A = T^{-1}, \end{cases}$$

with $$S = \begin{pmatrix} 0 & -1 \\ 1 & 0 \end{pmatrix}, \ U = \begin{pmatrix} 1 & 0 \\ 1 & 1 \end{pmatrix},$$

$$T = \begin{pmatrix} 1 & 1 \\ 0 & 1 \end{pmatrix};$$

and $$\bar{\partial}_I(\theta) = \begin{cases} +2\cos\theta + 2\sin\theta - 2; & \text{if } 0 \leq \theta \leq \frac{\pi}{2}, \\ +2\cos\theta - 2\sin\theta + 2; & \text{if } \frac{\pi}{2} \leq \theta \leq \pi, \\ -2\cos\theta - 2\sin\theta - 2; & \text{if } \pi \leq \theta < \frac{3\pi}{2}, \\ -2\cos\theta + 2\sin\theta + 2; & \text{if } \frac{3\pi}{2} \leq \theta \leq 2\pi; \end{cases}$$

and if $$A = \begin{pmatrix} a & b \\ c & d \end{pmatrix} \neq \begin{pmatrix} 1 & 0 \\ 0 & 1 \end{pmatrix} = I$$

labels an arithmetric arrow;
and if A labels a top arithmetic arrow and c>c, then $$\ddot{\partial}_A(\theta) = \begin{cases} +4(d^2 - c^2)\cos\theta + 8cd\ \sin\theta - 4(d^2 + c^2); & \text{if } \tan^{-1}\frac{2cd}{d^2 - c^2} \leq \theta \leq \tan^{-1}\frac{2(b+d)(a+c)}{(b+d)^2 - (a+c)^2} \\ +2(a^2 + d^2 - b^2 - c^2 + 2ac - 2bd)\cos\theta & \text{if } \tan^{-1}\frac{2(b+d)(a+c)}{(b+d)^2 - (a+c)^2} \leq \theta \leq \tan^{-1}\frac{2ba}{b^2 - a^2}, \\ +4(cd - ab - bc - ad)\sin\theta & \\ +2(a^2 + b^2 - c^2 - d^2 + 2ac + 2bd); & \\ +2(b^2 + d^2 - a^2 - x^2 + 2ac - 2bd)\cos\theta & \text{if } \tan^{-1}\frac{2ba}{b^2 - a^2} \leq \theta \leq \tan^{-1}\frac{2(d-b)(c-a)}{(d-b)^2 - (c-a)^2}, \\ +4(ab + cd - ad - bc)\sin\theta & \\ +2(-a^2 - b^2 - c^2 - d^2 + 2ac + 2bd); & \\ 0; & \text{otherwise;} \end{cases}$$

and if A labels a top arithmetic arrow and c≧a, then $$\ddot{\partial}_A(\theta) = \begin{cases} +2(a^2 + c^2 - b^2 - d^2 - 2ac + 2bd)\cos\theta & \text{if } \tan^{-1}\frac{2(d-b)(c-a)}{(d-b)^2 - (c-a)^2} \leq \theta \leq \tan^{-1}\frac{2cd}{d^2 - c^2}, \\ +4(ad + bc - ab - cd)\sin\theta & \\ +2(a^2 + b^2 + c^2 + d^2 - 2ac - 2bd); & \\ +2(a^2 + d^2 - b^2 - c^2 + 2bd - 2ac)\cos\theta & \text{if } \tan^{-1}\frac{2cd}{a^2 - c^2} \leq \theta \leq \tan^{-1}\frac{2(b+d)(a+c)}{(b+d)^2 - (a+c)^2}, \\ +4(ad + bc + cd - ad)\sin\theta & \\ +2(a^2 + b^2 - c^2 - d^2 + 2bd - 2ac); & \\ +4(a^2 - b^2)\cos\theta - 8ab\ \sin\theta + 4(a^2 + b^2); & \text{if } \tan^{-1}\frac{2(b+d)(a+c)}{(b+d)^2 - (a+c)^2} \leq \theta \leq \tan^{-1}\frac{2ba}{b^2 - a^2}, \\ 0; & \text{otherwise;} \end{cases}$$

and if A labels a bottom arithmetic arrow and a>−C, then $$\vartheta_A(\theta) = \begin{cases} +2(a^2+c^2-b^2-d^2+2ac-2bd)\cos\theta & \text{if } \tan^{-1}\frac{2(b+d)(a+c)}{(b+d)^2-(a+c)^2} \le \theta \le \tan^{-1}\frac{2bc}{b^2-a^2}, \\ +4(-d-ba-ab-cd)\sin\theta \\ +2(a^2+b^2+c^2+d^2+2ac+2bd); \\ +2(b^2+c^2-a^2-d^2+2ac-2bd)\cos\theta & \text{if } \tan^{-1}\frac{2(d-b)(c-a)}{(d-b)^2-(c-a)^2}, \\ +4(ab-ad-bc-cd)\sin\theta \\ +2(c^2+d^2-a^2-b^2+2ac+2bd); \\ +4(c^2-d^2)\cos\theta-8cd\sin\theta+4(c^2+d^2); & \text{if } \tan^{-1}\frac{2(d-b)(c-a)}{(d-b)^2-(c-a)^2} \le \theta \le \tan^{-1}\frac{2cd}{d^2-c^2}, \\ 0; & \text{otherwise;} \end{cases}$$

and if A labels a bottom arithmetic arrow and −c ≥ a, then $$\vartheta_A(\theta) = \begin{cases} +4(b^2-a^2)\cos\theta+8ab\sin\theta-4(a^2+b^2); & \text{if } \tan^{-1}\frac{2ba}{b^2-a^2} \le \theta \le \tan^{-1}\frac{2(d-b)(c-a)}{(d-b)^2-(c-a)^2}, \\ +2(b^2+c^2-a^2-d^2+2bd-2ac)\cos\theta & \text{if } \tan^{-1}\frac{2(d-b)(c-a)}{(d-b)^2-(c-a)^2} \le \theta \le \text{if } \tan^{-1}\frac{2cd}{d^2-c^2}, \\ +4(ad+bc+ab-cd)\sin\theta \\ +2(c^2+d^2-a^2-b^2-2ac-2bd); \\ +2(b^2+d^2-a^2-c^2+2bd-2ac)\cos\theta & \text{if } \tan^{-1}\frac{2cd}{d^2-c^2} \le \theta \le \text{if } \tan^{-1}\frac{2(b+d)(a+c)}{(b+d)^2-(a+c)^2}, \\ +4(ad+bc+cd+ab)\sin\theta \\ +2(-a^2-b^2-c^2-d^2-2ac-2bd); \\ 0; & \text{otherwise.} \end{cases}$$

9. A method as recited in claim 2 wherein the steps of sampling the input data at the points of the Farey quadrature and transforming the Farey-sampled data into wavelet coefficients is characterized by a binary cascade of arrow structures arising from the calculation of wavelet coefficients by sampling the input data in its initial form at the points of the Farey quadrature as defined along a circle in the complex plane.

10. A method as recited in claim 2 wherein the wavelet transformation is based on arithmetic wavelets and the step of transforming the Farey-sampled data into arithmetic wavelet coefficients includes the step of regularization.

11. A method as recited in claim 2 wherein the wavelet transformation and the reconstruction are based on a finite number of wavelets.

12. A method as recited in claim 2 wherein:
wavelet transformation is achieved via a plurality of wavelet transformation operations each for a specified arc along a circle in the complex plane; and
the plurality of wavelet transformation operations are calculated in parallel with each other.

13. A method as recited in claim 1 wherein the quantized intermediate form of the data is stored and retrieved prior to de-quantizing and reconstructing the data for use.

14. A method as recited in claim 1 wherein:
the steps of transforming the Farey-sampled data into the intermediate form and quantizing the intermediate form of the Farey-sampled data occur at a first physical location;

the quantized intermediate form of the data is transmitted to a second physical location; and
the steps of de-quantizing the quantized intermediate form of the Farey-sampled data and reconstructing the intermediate form of the Farey-sampled data in order to obtain reconstructed data occurs at the second physical location.

15. A method as recited in claim 14 further comprising the step of transmitting a reconstruction algorithm to the second physical location in order to accomplish reconstruction at the second physical location.

16. A method as recited in claim 1 wherein the input data is digital data.

17. A method as recited in claim 1 wherein the input data is analog data and the analog input data is sampled by placing analog sensors at locations corresponding to the points of the Farey quadrature.

18. A method as recited in claim 1 wherein the input data and the reconstructed data are multi-dimensional.

19. A method as recited in claim 2 wherein the step of reconstructing the intermediate form of the Farey-sampled data in order to obtain the reconstructed data is achieved via an inverse wavelet transformation which is characterized by a binary cascade.

20. A method as recited in claim 2 wherein the calculation of the wavelet transformation includes the step of renormalization.

21. A method as recited in claim 1 wherein the sampling of data at the points of the Farey quadrature includes temporary storage of sequences of data in a buffer.

22. A digital signal processing method for obtaining data in a transform domain comprising the steps of:
   providing input data in an initial form;
   sampling the input data at the points of a Farey quadrature;
   using an intermediate transform to transform the Farey-sampled data into an intermediate form; and
   using a primary transform to convert the data in intermediate form of the Farey-sampled data into transform coefficients representative of the data in a transform domain.

23. A method as recited in claim 22 wherein the primary transformation consists of one of the groups of following transformations: Fourier, Hilbert, Haar, Laplace, Bessel, Laguerre, Hermite, Chebyshev, Hotelling, Mersenne and Fermat.

24. A method as recited in claim 22 wherein the primary transformation consists of the Fourier transform, and the intermediate transform is a wavelet transformation based on arithmetic wavelets.

25. A method as recited in claim 24 wherein the intermediate transform is an arithmetic wavelet transform and the primary transform is a Fourier transform, and the conversion of the data from the intermediate form to the Fourier coefficients, $c_n^A$, is given by the following expressions:

$$A = \begin{pmatrix} a & b \\ c & d \end{pmatrix} \neq \begin{pmatrix} 1 & 0 \\ 0 & 1 \end{pmatrix} = I$$

labels an arithmetic arrow; and $$\pi i(n^3 - n)c_n^A = -[(c-a)^2 + (b-d)^2]\left[\frac{(b-d)-i(a-c)}{(b-d)+i(a-c)}\right]^n$$
$$+2(c^2+d^2)\left[\frac{d-ic}{d+ic}\right]^n + 2(a^2+b^2)\left[\frac{b-ia}{b+ia}\right]^n$$
$$-[(c+a)^2 + (b+d)^2]\left[\frac{(b+d)-i(a+c)}{(b+d)+i(a+c)}\right]^n;$$

and the coefficients $C_0^A$, $c_1^A$, $c_{-1}^A$ are given by $\pi c^{\pm 1 A}=\theta_h(c^2-d^2\pm 2icd)+\theta_r[(b-d)^2-(a-c)^2\mp 2i(b-d)(a-c)]/2+\theta_t(a^2-b^2\pm 2iab)+\theta_l[(b+d)^2-(a+c)^2\mp 2i(b+d)(a+c)]/2,$ $\pi c_0^A=2\theta_h(c^2+d^2)-\theta_r[(b-d)^2+(a-c)^2]+2\theta_t(a^2+b^2)-\theta_l[(b+d)^2+(a+c)^2],$ where the angles are $$\theta_n = \tan^{-1}\left(\frac{2cb}{d^2-c^2}\right), \theta_e = \tan^{-1}\left(\frac{2(b+d)(a+c)}{(b+d)^2-(a+c)^2}\right),$$
$$\theta_t = \tan^{-1}\left(\frac{2ab}{b^2-a^2}\right), \theta_\tau = \tan^{-1}\left(\frac{2(b-d)(a-c)}{(b-d)^2(a-c)^2}\right).$$

26. A method as recited in claim 22 wherein the intermediate transform is a wavelet transform based on arithmetic wavelets, and the step of using the intermediate transform includes the step of renormalization.

27. A method as recited in claim 22 wherein the primary transformation consists of a Fourier transform, and the intermediate transform is a wavelet transformation based on modular wavelets.

28. A method as recited in claim 22 wherein the intermediate transform is a wavelet transform based on modular wavelets, and the step of using the intermediate transform includes the step of renormalization.

29. A method as recited in claim 22 wherein the primary transformation consists of a Fourier transform, and the intermediate transform is a wavelet transformation based on fan wavelets.

30. A method as recited in claim 22 wherein the intermediate transform is a wavelet transform based on fan wavelets, and the step of using the intermediate transform includes the step of renormalization.

31. A method as recited in claim 22 wherein the sampling of data at the points of the Farey quadrature includes temporary storage of sequences of data in a buffer.

32. A method as recited in claim 22 wherein the input data is multi-dimensional.

33. A method as recited in claim 22 wherein the constants and coefficients required in the calculation of the intermediate transform and in the calculation of the primary transform are archived and recovered from memory at run time.

34. A method of data processing comprising the steps of:
   providing input data in an initial form;
   sampling the input data at the points of a Farey quadrature;
   transforming the Farey-sampled data to a second form; and
   processing the data in the second form.

35. A method as recited in claim 34 wherein:
   the step of transforming the Farey-sampled data into the second form is achieved via a wavelet transformation; and
   the second form of the Farey-sampled data takes the form of wavelet coefficients.

36. A method as recited in claim 35 wherein the wavelet transformation is based on arithmetic wavelets.

37. A method as recited in claim 36 wherein the arithmetic wavelets are defined in accordance with the following expressions:

$$\bar{\partial}_I(\theta) = \begin{cases} +2\cos\theta + 2\sin\theta - 2; & \text{if } 0 \leq \theta \leq \frac{\pi}{2}, \\ +2\cos\theta - 2\sin\theta + 2; & \text{if } \frac{\pi}{2} \leq \theta \leq \pi, \\ -2\cos\theta - 2\sin\theta - 2; & \text{if } \pi \leq \theta \leq \frac{3\pi}{2}, \\ -2\cos\theta + 2\sin\theta + 2; & \text{if } \frac{3\pi}{2} \leq \theta \leq 2\pi; \end{cases}$$

and if $$A = \begin{pmatrix} a & b \\ c & d \end{pmatrix} \neq \begin{pmatrix} 1 & 0 \\ 0 & 1 \end{pmatrix} = I$$

labels an arithmetric arrow;

and if A labels a top arithmetic arrow and a>c, then $$\bar{\partial}_I(\theta) = \begin{cases} +4(d^2-c^2)\cos\theta + 8cd\sin\theta - 4(d^2+c^2); & \text{if } \tan^{-1}\frac{2cd}{d^2-c^2} \leq \theta \leq \tan^{-1}\frac{2(b+d)(a+c)}{(b+d)^2-(a+c)^2}, \\ +2(a^2+d^2-b^2-c^2+2ac-2bd)\cos\theta & \text{if } \tan^{-1}\frac{2(b+d)(a+c)}{(b+d)^2-(a+c)^2} \leq \theta \leq \tan^{-1}\frac{2ba}{b^2-a^2} \\ +4(cd-ab-bc-ad)\sin\theta \\ +2(a^2+b^2-c^2-d^2+2ac+2bd); \\ +2(b^2+d^2-a^2-c^2+2ac-2bd)\cos\theta & \text{if } \tan^{-1}\frac{2ba}{b^2-a^2} \leq \theta \leq \tan^{-1}\frac{2(d-b)(c-a)}{(d-b)^2-(c-a)^2}, \\ +4(ab+cd-ad-bc)\sin\theta \\ +2(-a^2-b^2-c^2-d^2+2ac+2bd); \\ 0; & \text{otherwise;} \end{cases}$$

and if A labels a top arithmetic arrow and c≧a, then $$\bar{\partial}_A(\theta) = \begin{cases} +2(a^2+c^2-b^2-d^2-2ac+2bd)\cos\theta & \text{if } \tan^{-1}\frac{2(d-b)(c-a)}{(d-b)^2-(c-a)^2} \leq \theta \leq \tan^{-1}\frac{2cd}{d^2-c^2}, \\ +4(ad+bc-ab-cd)\sin\theta \\ +2(a^2+b^2+c^2+d^2-2ac-2bd); \\ +2(a^2+d^2-b^2-c^2+2bd-2ac)\cos\theta & \text{if } \tan^{-1}\frac{2cd}{a^2-c^2} \leq \theta \leq \tan^{-1}\frac{2(b+d)(a+c)}{(b+d)^2-(a+c)^2}, \\ +4(ad+bc+cd-ad)\sin\theta \\ +2(a^2+b^2-c^2-d^2+2bd-2ac); \\ +4(a^2-b^2)\cos\theta - 8ab\sin\theta + 4(a^2+b^2); & \text{if } \tan^{-1}\frac{2(b+d)(a+c)}{(b+d)^2-(a+c)^2} \leq \theta \leq \tan^{-1}\frac{2ba}{b^2-a^2}, \\ 0; & \text{otherwise;} \end{cases}$$

and if A labels a bottom arithmetic arrow and a>−c, then $$\bar{\partial}_A(\theta) = \begin{cases} +2(a^2+c^2-b^2-d^2+2ac-2bd)\cos\theta & \text{if } \tan^{-1}\frac{2(b+d)(a+c)}{(b+d)^2-(a+c)^2} \leq \theta \leq \tan^{-1}\frac{2bc}{b^2-a^2}, \\ +4(-d-ba-ab-cd)\sin\theta \\ +2(a^2+b^2+c^2+d^2+2ac+2bd); \\ +2(b^2+c^2-a^2-d^2+2ac-2bd)\cos\theta & \text{if } \tan^{-1}\frac{2(d-b)(c-a)}{(d-b)^2-(c-a)^2}, \\ +4(ab-ad-bc-cd)\sin\theta \\ +2(c^2+d^2-a^2-b^2+2ac+2bd); \\ +4(c^2-d^2)\cos\theta - 8cd\sin\theta + 4(c^2+d^2); & \text{if } \tan^{-1}\frac{2(d-b)(c-a)}{(d-b)^2-(c-a)^2} \leq \theta \leq \tan^{-1}\frac{2cd}{d^2-c^2}, \\ 0; & \text{otherwise;} \end{cases}$$

and if A labels a bottom arithmetic arrow and −c≧a, then $$\bar{\partial}_A(\theta) = \begin{cases} +4(b^2-a^2)\cos\theta + 8ab\sin\theta - 4(a^2-b^2); & \text{if } \tan^{-1}\frac{2ba}{b^2-a^2} \leq \theta \leq \tan^{-1}\frac{2(d-b)(c-a)}{(d-b)^2-(c-a)^2}, \\ +2(b^2+c^2-a^2-d^2+2bd-2ac)\cos\theta & \text{if } \tan^{-1}\frac{2(d-b)(c-a)}{(d-b)^2-(c-a)^2} \leq \theta \leq \tan^{-1}\frac{2cd}{d^2-c^2}, \\ +4(ad+bc+ab-cd)\sin\theta \\ +2(c^2+d^2-a^2-b^2-2ac-2bd); \\ +2(b^2+d^2-a^2-c^2+2bd-2ac)\cos\theta & \text{if } \tan^{-1}\frac{2cd}{d^2-c^2} \leq \theta \leq \tan^{-1}\frac{2(b+d)(a+c)}{(b+d)^2-(a+c)^2}, \\ +4(ad+bc+cd+ab)\sin\theta \\ +2(-a^2-b^2-c^2-d^2-2ac-2bd); \\ 0; & \text{otherwise.} \end{cases}$$

38. A method as recited in claim 35 wherein the wavelet transformation is based on modular wavelets.

39. A method as recited in claim 38 wherein the modular wavelets are defined in accordance with the following expressions:

$$\psi_A(\theta) = \sum_{n\geq 0} n\bar{\partial}_{U^n A}(\theta),$$

$$\psi_{SA}(\theta) = \sum_{n\geq 0} n\bar{\partial}_{T^{-n} A}(\theta),$$

where $$\bar{\partial}_A(\theta) = \begin{cases} \bar{\partial}_a(\theta); & \text{if } A \neq U^{-1}, T^{-1}, \\ \bar{\partial}_{U^{-1}}(\theta) - 2\sin\theta; & \text{if } A = U^{-1}, \\ \bar{\partial}_{T^{-1}}(\theta) + 2\sin\theta; & \text{if } A = T^{-1}, \end{cases}$$

with $$S = \begin{pmatrix} 0 & -1 \\ 1 & 0 \end{pmatrix}, \quad = \begin{pmatrix} 1 & 0 \\ 1 & 1 \end{pmatrix},$$

and $$T = \begin{pmatrix} 1 & 1 \\ 0 & 1 \end{pmatrix}; \text{ and}$$

$$\bar{\partial}_I(\theta) = \begin{cases} +2\cos\theta + 2\sin\theta - 2; & \text{if } 0 \leq \theta \leq \frac{\pi}{2}, \\ +2\cos\theta - 2\sin\theta + 2; & \text{if } \frac{\pi}{2} \leq \theta \leq \pi, \\ -2\cos\theta - 2\sin\theta - 2; & \text{if } \pi \leq \theta \leq \frac{3\pi}{2}, \\ -2\cos\theta + 2\sin\theta + 2; & \text{if } \frac{3\pi}{2} \leq \theta \leq 2\pi; \end{cases}$$

and if $$A = \begin{pmatrix} a & b \\ c & d \end{pmatrix} \neq \begin{pmatrix} 1 & 0 \\ 0 & 1 \end{pmatrix} = I$$

labels an arithmetric arrow;

and if A labels a top arithmetic arrow and a>c, then $$\bar{\partial}_A(\theta) = \begin{cases} +4(d^2-c^2)\cos\theta + 8cd\sin\theta - 4(d^2+c^2); & \text{if } \tan^{-1}\frac{2cd}{d^2-c^2} \leq \theta \leq \tan^{-1}\frac{2(b+d)(a+c)}{(b+d)^2-(a+c)^2}, \\ +2(a^2+d^2-b^2-c^2+2ac-2bd)\cos\theta & \text{if } \tan^{-1}\frac{2(b+d)(a+c)}{(b+d)^2-(a+c)^2} \leq \theta \leq \tan^{-1}\frac{2ba}{b^2-a^2}, \\ +4(cd-ab-bc-ad)\sin\theta \\ +2(a^2+b^2-c^2-d^2+2ac+2bd); \\ +2(b^2+d^2-a^2-c^2+2ac-2bd)\cos\theta & \text{if } \tan^{-1}\frac{2ba}{b^2-a^2} \leq \theta \leq \tan^{-1}\frac{2(d-b)(c-a)}{(d-b)^2-(c-a)^2}, \\ +4(ab+cd-ad-bc)\sin\theta \\ +2(-a^2-b^2-c^2-d^2+2ac+2bd); \\ 0; & \text{otherwise}; \end{cases}$$

and if A labels a top arithmetic arrow and c≧a, then $$\bar{\partial}_A(\theta) = \begin{cases} +2(a^2+c^2-b^2-d^2-2ac+2bd)\cos\theta & \text{if } \tan^{-1}\frac{2(d-b)(c-a)}{(d-b)^2-(c-a)^2} \leq \theta \leq \tan^{-1}\frac{2cd}{d^2-c^2}, \\ +4(ad+bc-ab-cd)\sin\theta \\ +2(a^2+b^2+c^2+d^2-2ac-2bd); \\ +2(a^2+d^2-b^2-c^2+2bd-2ac)\cos\theta & \text{if } \tan^{-1}\frac{2cd}{d^2-c^2} \leq \theta \leq \tan^{-1}\frac{2(b+d)(a+c)}{(b+d)^2-(a+c)^2}, \\ +4(ad+bc+cd-ab)\sin\theta \\ +2(a^2+b^2-c^2-d^2-2bd-2ac); \\ +4(a^2-b^2)\cos\theta - 8ab\sin\theta + 4(a^2+b^2); & \text{if } \tan^{-1}\frac{2(b+d)(a+c)}{(b+d)^2-(a+c)^2} \leq \theta \leq \tan^{-1}\frac{2ba}{b^2-a^2}, \\ 0; & \text{otherwise}; \end{cases}$$

and if A labels a bottom arithmetic arrow and a>−c, then $$\bar{\partial}_A(\theta) = \begin{cases} +2(a^2+c^2-b^2-d^2+2ac-2bd)\cos\theta & \text{if } \tan^{-1}\frac{2(b+d)(a+c)}{(b+d)^2-(a+c)^2} \le \theta \le \tan^{-1}\frac{2ba}{b^2-a^2}, \\ +4(-ad-bc-ab-cd)\sin\theta \\ +2(a^2+b^2+c^2+d^2+2ac+2bd); \\ +2(b^2+c^2-a^2-d^2+2ac-2bd)\cos\theta & \text{if } \tan^{-1}\frac{2ba}{b^2-a^2} \le \theta \le \tan^{-1}\frac{2(d-b)(c-a)}{(d-b)^2-(c-a)^2}, \\ +4(ab-ad-bc-cd)\sin\theta \\ +2(c^2+d^2-a^2-b^2+2ac+2bd); \\ +4(c^2-d^2)\cos\theta - 8cd\sin\theta + 4(c^2+d^2); & \text{if } \tan^{-1}\frac{2(d-b)(c-a)}{(d-b)^2-(c-a)^2} \le \theta \le \tan^{-1}\frac{2cd}{d^2-c^2}, \\ 0; & \text{otherwise;} \end{cases}$$

and if A labels a bottom arithmetic arrow and −c>a, then $$\bar{\partial}_A(\theta) = \begin{cases} +4(b^2-a^2)\cos\theta + 8ab\sin\theta - 4(a^2-b^2); & \text{if } \tan^{-1}\frac{2ba}{b^2-a^2} \le \theta \le \tan^{-1}\frac{2(d-b)(c-a)}{(d-b)^2-(c-a)^2}, \\ +2(b^2+c^2-a^2-d^2+2bd-2ac)\cos\theta & \text{if } \tan^{-1}\frac{2(d-b)(c-a)}{(d-b)^2-(c-a)^2} \le \theta \le \tan^{-1}\frac{2cd}{d^2-c^2}, \\ +4(ad+bc+ab-cd)\sin\theta \\ +2(c^2+d^2-a^2-b^2-2ac-2bd); \\ +2(b^2+d^2-a^2-c^2+2bd-2ac)\cos\theta & \text{if } \tan^{-1}\frac{2cd}{d^2-c^2} \le \theta \le \tan^{-1}\frac{2(b+d)(a+c)}{(b+d)^2-(a+c)^2}, \\ +4(ad+bc+cd+ab)\sin\theta \\ +2(-a^2-b^2-c^2-d^2-2ac-2bd); \\ 0; & \text{otherwise.} \end{cases}$$

40. A method as recited in claim 35 wherein the wavelet transformation is based on fan wavelets.

41. A method as recited in claim 40 wherein the fan wavelets are defined in accordance with the following expressions:

$$\phi_A(\theta) = \sum_{n\ge 0} \bar{\partial}_{U^n A}(\theta),$$

$$\phi_{SA}(\theta) = \sum_{n\ge 0} \bar{\partial}_{T^{-n} A}(\theta),$$

where $$\bar{\partial}_A(\theta) = \begin{cases} \bar{\partial}_A(\theta); & \text{if } A \ne U^{-1}, T^{-1}, \\ \bar{\partial}_{U^{-1}}(\theta) - 2\sin\theta; & \text{if } A = U^{-1}, \\ \bar{\partial}_{T^{-1}}(\theta) + 2\sin\theta; & \text{if } A = T^{-1}, \end{cases}$$

with $$S = \begin{pmatrix} 0 & -1 \\ 1 & 0 \end{pmatrix}, \ i = \begin{pmatrix} 1 & 0 \\ 1 & 1 \end{pmatrix},$$

and $$T = \begin{pmatrix} 1 & 1 \\ 0 & 1 \end{pmatrix};$$

and $$\bar{\partial}_I(\theta) = \begin{cases} +2\cos\theta + 2\sin\theta - 2; & \text{if } 0 \le \theta \le \frac{\pi}{2}, \\ +2\cos\theta - 2\sin\theta + 2; & \text{if } \frac{\pi}{2} \le \theta \le \pi, \\ -2\cos\theta - 2\sin\theta - 2; & \text{if } \pi \le \theta \le \frac{3\pi}{2}, \\ -2\cos\theta + 2\sin\theta + 2; & \text{if } \frac{3\pi}{2} \le \theta \le 2\pi; \end{cases}$$

and if $$A = \begin{pmatrix} a & b \\ c & d \end{pmatrix} \ne \begin{pmatrix} 1 & 0 \\ 0 & 1 \end{pmatrix} = I$$

labels an arithmetric arrow;

and if A labels a top arithmetic arrow and a>c, then $$\bar{\partial}_A(\theta) = \begin{cases} +4(d^2-c^2)\cos\theta + 8cd\sin\theta - 4(d^2+c^2); & \text{if } \tan^{-1}\frac{2cd}{d^2-c^2} \leq \theta \leq \tan^{-1}\frac{2(b+d)(a+c)}{(b+d)^2-(a+c)^2}, \\ +2(a^2+d^2-b^2-c^2+2ac-2bd)\cos\theta & \text{if } \tan^{-1}\frac{2(b+d)(a+c)}{(b+d)^2-(a+c)^2} \leq \theta \leq \tan^{-1}\frac{2ba}{b^2-a^2}, \\ +4(cd-ab-bc-ad)\sin\theta \\ +2(a^2+b^2-c^2-d^2+2ac+2bd); \\ +2(b^2+d^2-a^2-c^2+2ac-2bd)\cos\theta & \text{if } \tan^{-1}\frac{2ba}{b^2-a^2} \leq \theta \leq \tan^{-1}\frac{2(d-b)(c-a)}{(d-b)^2-(c-a)^2}, \\ +4(ab+cd-ad-bc)\sin\theta \\ +2(-a^2-b^2-c^2-d^2+2ac+2bd); \\ 0; & \text{otherwise;} \end{cases}$$

and if A labels a top arithmetic arrow and c≧a, then $$\bar{\partial}_A(\theta) = \begin{cases} +2(a^2+c^2-b^2-d^2-2ac+2bd)\cos\theta & \text{if } \tan^{-1}\frac{2(d-b)(c-a)}{(d-b)^2-(c-a)^2} \leq \theta \leq \tan^{-1}\frac{2ba}{b^2-a^2}, \\ +4(ad+bc-ab-cd)\sin\theta \\ +2(a^2+b^2+c^2+d^2-2ac-2bd); \\ +2(a^2+d^2-b^2-c^2+2bd-2ac)\cos\theta & \text{if } \tan^{-1}\frac{2cd}{d^2-c^2} \leq \theta \leq \tan^{-1}\frac{2(b+d)(a+c)}{(b+d)^2-(a+c)^2}, \\ +4(ad+bc+cd-ab)\sin\theta \\ +2(a^2+b^2-c^2-d^2-2bd-2ac); \\ +4(a^2-b^2)\cos\theta - 8ab\sin\theta + 4(a^2+b^2); & \text{if } \tan^{-1}\frac{2(b+d)(a+c)}{(b+d)^2-(a+c)^2} \leq \theta \leq \tan^{-1}\frac{2ba}{b^2-a^2}, \\ 0; & \text{otherwise;} \end{cases}$$

and if A labels a bottom arithmetic arrow and a>−c, then $$\bar{\partial}_A(\theta) = \begin{cases} +2(a^2+c^2-b^2-d^2+2ac-2bd)\cos\theta & \text{if } \tan^{-1}\frac{2(b+d)(a+c)}{(b+d)^2-(a+c)^2} \leq \theta \leq \tan^{-1}\frac{2ba}{b^2-a^2}, \\ +4(-ad-bc-ab-cd)\sin\theta \\ +2(a^2+b^2+c^2+d^2+2bd); \\ +2(b^2+d^2-a^2-c^2+2ac-2bd)\cos\theta & \text{if } \tan^{-1}\frac{2ba}{b^2-a^2} \leq \theta \leq \tan^{-1}\frac{2(d-b)(c-a)}{(d-b)^2-(c-a)^2}, \\ +4(ab-ad-bc-cd)\sin\theta \\ +2(c^2+d^2-a^2-b^2+2ac+2bd); \\ +4(c^2-d^2)\cos\theta - 8cd\sin\theta + 4(c^2+d^2); & \text{if } \tan^{-1}\frac{2(d-b)(c-a)}{(d-b)^2-(c-a)^2} \leq \theta \leq \tan^{-1}\frac{2ba}{b^2-a^2}, \\ 0; & \text{otherwise;} \end{cases}$$

and if A labels a bottom arithmetic arrow and −c>a, then $$\bar{\partial}_A(\theta) = \begin{cases} +4(b^2-a^2)\cos\theta + 8ab\sin\theta - 4(a^2+b^2); & \text{if } \tan^{-1}\frac{2ba}{b^2-a^2} \leq \theta \leq \tan^{-1}\frac{2(d-b)(c-a)}{(d-b)^2-(c-a)^2}, \\ +2(b^2+c^2-a^2-d^2+2bd-2ac)\cos\theta & \text{if } \tan^{-1}\frac{2(d-b)(c-a)}{(d-b)^2-(c-a)^2} \leq \theta \leq \tan^{-1}\frac{2cd}{d^2-c^2}, \\ +4(ad+bc+ab-cd)\sin\theta \\ +2(c^2+d^2-a^2-b^2-2ac-2bd); \\ +2(b^2+d^2-a^2-c^2+2bd-2ac)\cos\theta & \text{if } \tan^{-1}\frac{2cd}{d^2-c^2} \leq \theta \leq \tan^{-1}\frac{2(b+d)(a+c)}{(b+d)^2-(a+c)^2}, \\ +4(ad+bc+cd+ab)\sin\theta \\ +2(-a^2-b^2-c^2-d^2-2ac-2bd); \\ 0; & \text{otherwise.} \end{cases}$$

42. A method as recited in claim 35 wherein the steps of sampling the input data at the points of the Farey quadrature and transforming the Farey-sampled into wavelet coefficients is characterized by a binary cascade of arrow structures arising from the calculation of wavelet coefficients by sampling the input data in its initial form at the points of the Farey quadrature as defined along a circle in the complex plane.

43. A method as recited in claim 42 wherein the wavelet transformation is based on arithmetic wavelets and the step of transforming the Farey-sampled data into arithmetic wavelet coefficients includes the step of regularization.

44. A method as recited in claim 35 wherein the wavelet transformation is based on a finite number of wavelets.

45. A method as recited in claim 35 wherein:
wavelet transformation is achieved via a plurality of wavelet transformation operations each for a specified arc along a circle in the complex plane; and
the plurality of wavelet transformation operations are calculated in parallel with each other.

46. A method as recited in claim 34 wherein the input data is digital data.

47. A method as recited in claim 34 wherein the input data is analog date and the analog input data is sampled by placing analog sensors at locations corresponding to the points of the Farey quadrature.

48. A method as recited in claim 34 wherein the input data is multi-dimensional.

49. A method as recited in claim 34 wherein the sampling of data at the points of the Farey quadrature includes temporary storage of sequences of data in a buffer.

50. A digital processing system comprising a digital filter that receives an input signal and outputs a transformed signal, the digital filter being an arithmetic wavelet filter in which arithmetic wavelets are defined in accordance with the following expressions:

$$\bar{\partial}_I(\theta) = \begin{cases} +2\cos\theta + 2\sin\theta - 2; & \text{if } 0 \leq \theta \leq \frac{\pi}{2}, \\ +2\cos\theta - 2\sin\theta + 2; & \text{if } \frac{\pi}{2} \leq \theta \leq \pi, \\ -2\cos\theta - 2\sin\theta - 2; & \text{if } \pi \leq \theta \leq \frac{3\pi}{2}, \\ -2\cos\theta + 2\sin\theta + 2; & \text{if } \frac{3\pi}{2} \leq \theta \leq 2\pi; \end{cases}$$

and if $$A = \begin{pmatrix} a & b \\ c & d \end{pmatrix} \neq \begin{pmatrix} 1 & 0 \\ 0 & 1 \end{pmatrix} = I$$

labels an arithmetric arrow;
and if A labels a top arithmetic arrow and a>c, then $$\bar{\partial}_A(\theta) = \begin{cases} +4(d^2 - c^2)\cos\theta + 8cd\sin\theta - 4(d^2 + c^2); & \text{if } \tan^{-1}\frac{2cd}{d^2 - c^2} \leq \theta \leq \tan^{-1}\frac{2(b+d)(a+c)}{(b+d)^2 - (a+c)^2}, \\ +2(a^2 + d^2 - b^2 - c^2 + 2ac - 2bd)\cos\theta & \text{if } \tan^{-1}\frac{2(b+d)(a+c)}{(b+d)^2 - (a+c)^2} \leq \theta \leq \tan^{-1}\frac{2ba}{b^2 - a^2}, \\ +4(cd - ab - bc - ad)\sin\theta \\ +2(a^2 + b^2 - c^2 - d^2 + 2ac + 2bd); \\ +2(b^2 + d^2 - a^2 - c^2 + 2ac - 2bd)\cos\theta & \text{if } \tan^{-1}\frac{2ba}{b^2 - a^2} \leq \theta \leq \tan^{-1}\frac{2(d-b)(c-a)}{(d-b)^2 - (c-a)^2}, \\ +4(ab + cd - ad - bc)\sin\theta \\ +2(-a^2 - b^2 - c^2 - d^2 + 2ac + 2bd); \\ 0; & \text{otherwise;} \end{cases}$$

and if A labels a top arithmetic arrow and c≧a, then $$\bar{\partial}_A(\theta) = \begin{cases} +2(a^2 + c^2 - b^2 - d^2 - 2ac + 2bd)\cos\theta & \text{if } \tan^{-1}\frac{2(d-b)(c-a)}{(d-b)^2 - (c-a)^2} \leq \theta \leq \tan^{-1}\frac{2ba}{b^2 - a^2}, \\ +4(ad + bc - ab - cd)\sin\theta \\ +2(a^2 + b^2 + c^2 + d^2 - 2ac - 2bd); \\ +2(a^2 + d^2 - b^2 - c^2 + 2bd - 2ac)\cos\theta & \text{if } \tan^{-1}\frac{2cd}{d^2 - c^2} \leq \theta \leq \tan^{-1}\frac{2(b+d)(a+c)}{(b+d)^2 - (a+c)^2}, \\ +4(ad + bc + cd - ab)\sin\theta \\ +2(a^2 + b^2 - c^2 - d^2 - 2bd - 2ac); \\ +4(a^2 - b^2)\cos\theta - 8ab\sin\theta + 4(a^2 + b^2); & \text{if } \tan^{-1}\frac{2(b+d)(a+c)}{(b+d)^2 - (a+c)^2} \leq \theta \leq \tan^{-1}\frac{2ba}{b^2 - a^2}, \\ 0; & \text{otherwise;} \end{cases}$$

and if A labels a bottom arithmetic arrow and a>−c, then $$\bar{\partial}_A(\theta) = \begin{cases} +2(a^2+c^2-b^2-d^2+2ac-2bd)\cos\theta \\ +4(-ad-bc-ab-cd)\sin\theta \\ +2(a^2+b^2+c^2+d^2+2ac+2bd); & \text{if } \tan^{-1}\frac{2(b+d)(a+c)}{(b+d)^2-(a+c)^2} \leq \theta \leq \tan^{-1}\frac{2ba}{b^2-a^2}, \\ +2(b^2+c^2-a^2-d^2+2ac-2bd)\cos\theta \\ +4(ab-ad-bc-cd)\sin\theta \\ +2(c^2+d^2-a^2-b^2+2ac+2bd); & \text{if } \tan^{-1}\frac{2ba}{b^2-a^2} \leq \theta \leq \tan^{-1}\frac{2(d-b)(c-a)}{(d-b)^2-(c-a)^2}, \\ +4(c^2-d^2)\cos\theta - 8cd\sin\theta + 4(c^2+d^2); & \text{if } \tan^{-1}\frac{2(d-b)(c-a)}{(d-b)^2-(c-a)^2} \leq \theta \leq \tan^{-1}\frac{2cd}{b^2-a^2}, \\ 0; & \text{otherwise;} \end{cases}$$

and if A labels a bottom arithmetic arrow and −c≧a, then $$\bar{\partial}_A(\theta) = \begin{cases} +4(b^2-a^2)\cos\theta + 8ab\sin\theta - 4(a^2+b^2); & \text{if } \tan^{-1}\frac{2ba}{b^2-a^2} \leq \theta \leq \tan^{-1}\frac{2(d-b)(c-a)}{(d-b)^2-(c-a)^2}, \\ +2(b^2+c^2-a^2-d^2+2bd-2ac)\cos\theta & \text{if } \tan^{-1}\frac{2(d-b)(c-a)}{(d-b)^2-(c-a)^2} \leq \theta \leq \tan^{-1}\frac{2cd}{d^2-c^2}, \\ +4(ad+bc+ab-cd)\sin\theta \\ +2(c^2+d^2-a^2-b^2-2ac-2bd); \\ +2(b^2+d^2-a^2-c^2+2bd-2ac)\cos\theta & \text{if } \tan^{-1}\frac{2cd}{d^2-c^2} \leq \theta \leq \tan^{-1}\frac{2(b+d)(a+c)}{(b+d)^2-(a+c)^2}, \\ +4(ad+bc+cd+ab)\sin\theta \\ +2(-a^2-b^2-c^2-d^2-2ac-2bd); \\ 0; & \text{otherwise.} \end{cases}$$

51. A digital processing system comprising a digital filter that receives an input signal and outputs a transformed signal, the digital filter being a modular wavelet filter in which modular wavelets are defined in accordance with the following expressions:

$$\psi_A(\theta) = \sum_{n\geq 0} n\bar{\partial}_{U^n A}(\theta),$$

$$\psi_{SA}(\theta) = \sum_{n\geq 0} n\bar{\partial}_{T^{-n} A}(\theta),$$

where $$\bar{\partial}_A(\theta) = \begin{cases} \bar{\partial}_A(\theta); & \text{if } A \neq U^{-1}, T^{-1}, \\ \bar{\partial}_{U^{-1}}(\theta) - 2\sin\theta; & \text{if } A = U^{-1}, \\ \bar{\partial}_{T^{-1}}(\theta) + 2\sin\theta; & \text{if } A = T^{-1}, \end{cases}$$

with $$S = \begin{pmatrix} 0 & -1 \\ 1 & 0 \end{pmatrix}, U = \begin{pmatrix} 1 & 0 \\ 1 & 1 \end{pmatrix},$$

and $$T = \begin{pmatrix} 1 & 1 \\ 0 & 1 \end{pmatrix};$$

and $$\bar{\partial}_I(\theta) = \begin{cases} +2\cos\theta + 2\sin\theta - 2; & \text{if } 0 \leq \theta \leq \frac{\pi}{2}, \\ +2\cos\theta - 2\sin\theta + 2; & \text{if } \frac{\pi}{2} \leq \theta \leq \pi, \\ -2\cos\theta - 2\sin\theta - 2; & \text{if } \pi \leq \theta \leq \frac{3\pi}{2}, \\ -2\cos\theta + 2\sin\theta + 2; & \text{if } \frac{3\pi}{2} \leq \theta \leq 2\pi; \end{cases}$$

and if $$A = \begin{pmatrix} a & b \\ c & d \end{pmatrix} \neq \begin{pmatrix} 1 & 0 \\ 0 & 1 \end{pmatrix} = I$$

labels an arithmetic arrow;

and if A labels a top arithmetic arrow and a>c, then $$\overline{\partial}_A(\theta) = \begin{cases} +4(d^2-c^2)\cos\theta + 8cd\sin\theta - 4(d^2+c^2); & \text{if } \tan^{-1}\frac{2cd}{d^2-c^2} \le \tan^{-1}\frac{2(b+d)(a+c)}{(b+d)^2-(a-+c)^2}, \\ +2(a^2+d^2-b^2-c^2+2ac-2bd)\cos\theta & \text{if } \tan^{-1}\frac{2(b+d)(a+c)}{(b+d)^2-(a+c)^2} \le \theta \le \tan^{-1}\frac{2ba}{b^2-a^2}, \\ +4(cd-ab-bc-ad)\sin\theta \\ +2(a^2+b^2-c^2-d^2+2ac+2bd); \\ +2(b^2+d^2-a^2-c^2+2ac-2bd)\cos\theta & \text{if } \tan^{-1}\frac{2ba}{b^2-a^2} \le \theta \le \tan^{-1}\frac{2(d-b)(c-a)}{(d-b)^2-(c-a)^2}, \\ +4(ab+cd-ad-bc)\sin\theta \\ +2(-a^2-b^2-c^2-d^2+2ac+2bd); \\ 0; & \text{otherwise;} \end{cases}$$

and if A labels a top arithmetic arrow and c≧a, then $$\overline{\partial}_A(\theta) = \begin{cases} +2(a^2+c^2-b^2-d^2-2ac+2bd)\cos\theta & \text{if } \tan^{-1}\frac{2(d-b)(c-a)}{(d-b)^2-(c-a)^2} \le \theta \le \tan^{-1}\frac{2cd}{d^2-c^2}, \\ +4(ad+bc-ab-cd)\sin\theta \\ +2(a^2+b^2+c^2+d^2-2ac-2bd); \\ +2(a^2+d^2-b^2-c^2+2bd-2ac)\cos\theta & \text{if } \tan^{-1}\frac{2cd}{d^2-c^2} \le \theta \le \tan^{-1}\frac{2(b+d)(a+c)}{(b+d)^2-(a+c)^2}, \\ +4(ad+bc+cd-ab)\sin\theta \\ +2(a^2+b^2-c^2-d^2-2bd-2ac); \\ +4(a^2-b^2)\cos\theta - 8ab\sin\theta - 4(a^2+b^2); & \text{if } \tan^{-1}\frac{2(b+d)(a+c)}{(b+d)^2-(a+c)} \le \theta \le \tan^{-1}\frac{2ba}{b^2-a^2}, \\ 0; & \text{otherwise;} \end{cases}$$

and if A labels a bottom arithmetic arrow and a>−c, then $$\overline{\partial}_A(\theta) = \begin{cases} +2(a^2+c^2-b^2-d^2+2ac-2bd)\cos\theta & \text{if } \tan^{-1}\frac{2(b+d)(a+c)}{(b+d)^2-(a+c)} \le \theta \le \tan^{-1}\frac{2ba}{b^2-a^2}, \\ +4(-ad-bc-ab-cd)\sin\theta \\ +2(a^2+b^2+c^2+d^2+2ac+2bd); \\ +2(b^2+c^2-a^2-d^2+2ac-2bd)\cos\theta & \text{if } \tan^{-1}\frac{2ba}{b^2-a^2} \le \theta \le \tan^{-1}\frac{2(d-b)(c-a)}{(d-b)^2-(c-a)^2}, \\ +4(ab-ad-bc-cd)\sin\theta \\ +2(c^2+d^2-a^2-b^2+2ac+2bd); \\ +4(c^2-d^2)\cos\theta - 8cd\sin\theta + 4(c^2+d^2); & \text{if } \tan^{-1}\frac{2(d-b)(c-a)}{(d-b)^2-(c-a)^2} \le \theta \le \tan^{-1}\frac{2cd}{d^2-c^2}, \\ 0; & \text{otherwise;} \end{cases}$$

and if A labels a bottom arithmetic arrow and −c≧a, then $$\overline{\partial}_A(\theta) = \begin{cases} +4(b^2-a^2)\cos\theta + 8ab\sin\theta - 4(d^2+b^2); & \text{if } \tan^{-1}\frac{2ba}{b^2-a^2} \le \theta \le \tan^{-1}\frac{2(d-b)(c-a)}{(d-b)^2-(c-a)^2}, \\ +2(b^2+c^2-a^2-d^2+2bd-2ac)\cos\theta & \text{if } \tan^{-1}\frac{2(d-b)(c-a)}{(d-b)^2-(c-a)^2} \le \theta \le \tan^{-1}\frac{2cd}{d^2-c^2}, \\ +4(ad+bc+ab-cd)\sin\theta \\ +2(c^2+d^2-a^2-b^2-2ac-2bd); \\ +2(b^2+d^2-a^2-c^2+2bd-2ac)\cos\theta & \text{if } \tan^{-1}\frac{2cd}{d^2-c^2} \le \tan^{-1}\frac{2(b+d)(a+c)}{(b+d)^2-(a-+c)^2}, \\ +4(ad+bc+cd+ab)\sin\theta \\ +2(-a^2-b^2-c^2-d^2-2ac-2bd); \\ 0; & \text{otherwise;} \end{cases}$$

52. A digital processing system comprising a digital filter that receives an input signal and outputs a transformed signal, the digital filter being a fan wavelet filter in which fan wavelets are defined in accordance with the following expressions:

$$\phi_A(\theta) = \sum_{n \geq 0} \overline{\partial}_{U^n A}(\theta),$$

$$\phi_{SA}(\theta) = \sum_{n \geq 0} \overline{\partial}_{T^{-n} A}(\theta),$$

where $$\overline{\partial}_A(\theta) = \begin{cases} \overline{\partial}_A(\theta); & \text{if } A \neq U^{-1}, T^{-1}, \\ \overline{\partial}_{U^{-1}}(\theta) - 2\sin\theta; & \text{if } A = U^{-1}, \\ \overline{\partial}_{T^{-1}}(\theta) + 2\sin\theta; & \text{if } A = T^{-1}, \end{cases}$$

with $$S = \begin{pmatrix} 0 & -1 \\ 1 & 0 \end{pmatrix}, U = \begin{pmatrix} 1 & 0 \\ 1 & 1 \end{pmatrix},$$

and $$T = \begin{pmatrix} 1 & 1 \\ 0 & 1 \end{pmatrix};$$

and $$\overline{\partial}_I(\theta) = \begin{cases} +2\cos\theta + 2\sin\theta - 2; & \text{if } 0 \leq \theta \leq \frac{\pi}{2}, \\ +2\cos\theta - 2\sin\theta + 2; & \text{if } \frac{\pi}{2} \leq \theta \leq \pi, \\ -2\cos\theta - 2\sin\theta - 2; & \text{if } \pi \leq \theta \leq \frac{3\pi}{2}, \\ -2\cos\theta + 2\sin\theta + 2; & \text{if } \frac{3\pi}{2} \leq \theta \leq 2\pi; \end{cases}$$

and if $$A = \begin{pmatrix} a & b \\ c & d \end{pmatrix} \neq \begin{pmatrix} 1 & 0 \\ 0 & 1 \end{pmatrix} = I$$

labels an arithmetic arrow;
and if $A$ labels a top arithmetic arrow and $a > c$, then $$\overline{\partial}_A(\theta) = \begin{cases} +4(d^2 - c^2)\cos\theta + 8cd\sin\theta - 4(d^2 + c^2); & \text{if } \tan^{-1}\frac{2cd}{d^2 - c^2} \leq \theta \leq \tan^{-1}\frac{2(b+d)(a+c)}{(b+d)^2 - (a+c)^2}, \\ +2(a^2 + d^2 - b^2 - c^2 + 2ac - 2bd)\cos\theta & \text{if } \tan^{-1}\frac{2(b+d)(a+c)}{(b+d)^2 - (a+c)} \leq \theta \leq \tan^{-1}\frac{2ba}{b^2 - a^2}, \\ +4(cd - ab - bc - ad)\sin\theta \\ +2(a^2 + b^2 - c^2 - d^2 + 2ac + 2bd); \\ +2(b^2 + d^2 - a^2 - c^2 + 2ac - 2bd)\cos\theta & \text{if } \tan^{-1}\frac{2ba}{b^2 - a^2} \leq \theta \leq \tan^{-1}\frac{2(d-b)(c-a)}{(d-b)^2 - (c-a)^2}, \\ +4(ab + cd - ad - bc)\sin\theta \\ +2(-a^2 - b^2 - c^2 - d^2 + 2ac + 2bd); \\ 0; & \text{otherwise;} \end{cases}$$

and if $A$ labels a top arithmetic arrow and $c \geq a$, then $$\overline{\partial}_A(\theta) = \begin{cases} +2(a^2 + c^2 - b^2 - d^2 - 2ac + 2bd)\cos\theta & \text{if } \tan^{-1}\frac{2(d-b)(c-a)}{(d-b)^2 - (c-a)^2} \leq \theta \leq \tan^{-1}\frac{2cd}{d^2 - c^2}, \\ +4(ad + bc - ab - cd)\sin\theta \\ +2(a^2 + b^2 + c^2 + d^2 - 2ac - 2bd); \\ +2(a^2 + d^2 - b^2 - c^2 + 2bd - 2ac)\cos\theta & \text{if } \tan^{-1}\frac{2cd}{d^2 - c^2} \leq \theta \leq \tan^{-1}\frac{2(b+d)(a+c)}{(b+d)^2 - (a+c)^2}, \\ +4(ad + bc + cd - ab)\sin\theta \\ +2(a^2 + b^2 - c^2 - d^2 - 2bd - 2ac); \\ +4(a^2 - b^2)\cos\theta - 8ab\sin\theta - 4(a^2 + b^2); & \text{if } \tan^{-1}\frac{2(b+d)(a+c)}{(b+d)^2 - (a+c)} \leq \theta \leq \tan^{-1}\frac{2ba}{b^2 - a^2}, \\ 0; & \text{otherwise;} \end{cases}$$

and if A labels a bottom arithmetic arrow and a>−c, then $$\bar{\partial}_A(\theta) = \begin{cases} +2(a^2+c^2-b^2-d^2+2ac+2bd)\cos\theta & \text{if } \tan^{-1}\frac{2(b+d)(a+c)}{(b+d)^2-(a+c)^2} \leq \theta \leq \tan^{-1}\frac{2ba}{b^2-a^2}, \\ +4(-ad-bc-ab-cd)\sin\theta \\ +2(a^2+b^2+c^2+d^2+2ac+2bd); \\ +2(b^2+c^2-a^2-d^2+2ac-2bd)\cos\theta & \text{if } \tan^{-1}\frac{2ba}{b^2-a^2} \leq \theta \leq \tan^{-1}\frac{2(d-b)(c-a)}{(d-b)^2-(c-a)^2}, \\ +4(ab-ad-bc-cd)\sin\theta \\ +2(c^2+d^2-a^2-b^2+2ac+2bd); \\ +4(c^2-d^2)\cos\theta - 8cd\sin\theta + 4(c^2+d^2); & \text{if } \tan^{-1}\frac{2(d-b)(c-a)}{(d-b)^2-(c-a)^2} \leq \theta \leq \tan^{-1}\frac{2cd}{d^2-c^2}, \\ 0; & \text{otherwise;} \end{cases}$$

and if A labels a bottom arithmetic arrow and −c ≧ a, then $$\bar{\partial}_A(\theta) = \begin{cases} +4(b^2-a^2)\cos\theta + 8ab\sin\theta - 4(a^2+b^2); & \text{if } \tan^{-1}\frac{2ba}{b^2-a^2} \leq \theta \leq \tan^{-1}\frac{2(d-b)(c-a)}{(d-b)^2-(c-a)^2}, \\ +2(b^2+c^2-a^2-d^2+2bd-2ac)\cos\theta & \text{if } \tan^{-1}\frac{2(d-b)(c-a)}{(d-b)^2-(c-a)^2} \leq \theta \leq \tan^{-1}\frac{2cd}{d^2-c^2}, \\ +4(ad+bc+ab-cd)\sin\theta \\ +2(c^2+d^2-a^2-b^2-2ac-2bd); \\ +2(b^2+d^2-a^2-c^2+2bd-2ac)\cos\theta & \text{if } \tan^{-1}\frac{2cd}{d^2-c^2} \leq \theta \leq \tan^{-1}\frac{2(b+d)(a+c)}{(b+d)^2-(a+c)^2}, \\ +4(ad+bc+cd+ab)\sin\theta \\ +2(-a^2-b^2-c^2-d^2-2ac-2bd); \\ 0; & \text{otherwise.} \end{cases}$$

53. A method of obtaining an inverse transform of input digital data comprising the steps of:
providing input digital data in an initial form;
transforming the data in the initial form to an intermediate form; and
transforming the intermediate form of the data using an intermediate inverse transform to obtain output values at the points of a Farey quadrature.

54. A method as recited in claim 53 wherein the input digital data is in the form of Fourier coefficients and a combination of transforming the data from the Fourier coefficients to the intermediate form and from the intermediate form to obtain output values at the points of the Farey quadrature constitutes an inverse Fourier transform.

55. A method as recited in claim 54 wherein the intermediate form of the data is in the form of wavelet coefficients.

56. A method as recited in claim 55 wherein the wavelet coefficients are coefficients for arithmetic wavelets, $$\bar{\partial}_A(\theta) = \begin{cases} \bar{\partial}_A(\theta); & \text{if } A \neq U^{-1}, T^{-1}, \\ \bar{\partial}_{U^{-1}}(\theta) + 2\sin\theta; & \text{if } A = U^{-1}, \\ \bar{\partial}_{T^{-1}}(\theta) - 2\sin\theta; & \text{if } A = T^{-1}, \end{cases}$$

with $$U^{-1} = \begin{pmatrix} 1 & 0 \\ -1 & 1 \end{pmatrix},$$

and $$T^{-1} = \begin{pmatrix} 1 & -1 \\ 0 & 1 \end{pmatrix},$$

and conversion of the data from the initial form to the intermediate form is based on the following expressions:

$$e^{in\theta} = \cos n\theta + i\sin n\theta$$
$$= -[c_0^n + c_1^n e^{i\theta} + c_{-1}^n e^{-i\theta}] +$$
$$\frac{i}{4}\sum_A \left\{ n(\xi^n + \eta^n) + \frac{\eta+\xi}{\eta-\xi}(\xi^n - \eta^n) \right\} \bar{\partial}_A(\theta),$$

where the sum is over all arithmetic arrows, the underlying chord of which has complex endpoints $\xi$, $\eta$, and $$c_0^n = \begin{cases} -1, & n \equiv 0(4); \\ 0, & n \equiv 1(4); \\ -1, & n \equiv 2(4); \\ 0, & n \equiv 3(4); \end{cases} \quad c_1^n = \begin{cases} 0, & n \equiv 0(4); \\ -1, & n \equiv 1(4); \\ i, & n \equiv 2(4); \\ 0, & n \equiv 3(4); \end{cases} \quad c_{-1}^n = \begin{cases} 0, & n \equiv 0(4); \\ 0, & n \equiv 1(4); \\ -i, & n \equiv 2(4); \\ -1, & n \equiv 3(4); \end{cases}$$

57. A method as recited in claim 55 wherein the wavelet coefficients are coefficients for modular wavelets, A, and conversion of the data from the initial form to the intermediate form is based on the following expressions:

$$e^{in\theta} = \cos n\theta + i\sin n\theta$$
$$= -[c_0^n + c_1^n e^{i\theta} + c_{-1}^n e^{-i\theta}] +$$
$$\frac{i}{4}\sum_A \left\{ n(\xi^n + \eta^n) + \frac{\eta+\xi}{\eta-\xi}(\xi^n - \eta^n) \right\}[\psi_{UA}(\theta) - 2\psi_A(\theta) + \psi_{U^{-1}A}(\theta)],$$

where the sum is over all arithmetic arrows, the underlying chord of which has complex endpoints $\xi$, $\eta$, where $$U^{\pm 1} = \begin{pmatrix} 1 & 0 \\ \pm 1 & 1 \end{pmatrix},$$

and where $$c_0^n = \begin{cases} -1, & n \equiv 0(4); \\ 0, & n \equiv 1(4); \\ -1, & n \equiv 2(4); \\ 0, & n \equiv 3(4); \end{cases} \quad c_1^n = \begin{cases} 0, & n \equiv 0(4); \\ -1, & n \equiv 1(4); \\ i, & n \equiv 2(4); \\ 0, & n \equiv 3(4); \end{cases} \quad c_{-1}^n = \begin{cases} 0, & n \equiv 0(4); \\ 0, & n \equiv 1(4); \\ -i, & n \equiv 2(4); \\ -1, & n \equiv 3(4); \end{cases}$$

58. A method as recited in claim 55 wherein the wavelet coefficients are coefficients for fan wavelets, Ø A, and conversion of the data from the initial form to the intermediate form is based on the following expressions:

$$e^{in\theta} = \cos n\theta + i\sin n\theta$$
$$= -[c_0^n + c_1^n e^{i\theta} + c_{-1}^n e^{-i\theta}] +$$
$$\frac{i}{4}\sum_A \left\{ n(\xi^n + \eta^n) + \frac{\eta+\xi}{\eta-\xi}(\xi^n - \eta^n) \right\}[\phi_A(\theta) - \phi_{UA}(\theta)],$$

where the sum is over all arithmetic arrows, the underlying chord of which has complex endpoints $\xi$, $\eta$; where $$U = \begin{pmatrix} 1 & 0 \\ 1 & 1 \end{pmatrix},$$

and where $$c_0^n = \begin{cases} -1, & n \equiv 0(4); \\ 0, & n \equiv 1(4); \\ -1, & n \equiv 2(4); \\ 0, & n \equiv 3(4); \end{cases} \quad c_1^n = \begin{cases} 0, & n \equiv 0(4); \\ -1, & n \equiv 1(4); \\ i, & n \equiv 2(4); \\ 0, & n \equiv 3(4); \end{cases} \quad c_{-1}^n = \begin{cases} 0, & n \equiv 0(4); \\ 0, & n \equiv 1(4); \\ -i, & n \equiv 2(4); \\ -1, & n \equiv 3(4). \end{cases}$$

where the sum is over all arithmetic arrows, the underlying chord of which has complex endpoints $\xi$, $\eta$, where $$U^{\pm 1} = \begin{pmatrix} 1 & 0 \\ \pm 1 & 1 \end{pmatrix},$$

and where $$c_0^n = \begin{cases} -1, & n \equiv 0(4); \\ 0, & n \equiv 1(4); \\ -1, & n \equiv 2(4); \\ 0, & n \equiv 3(4); \end{cases} \quad c_1^n = \begin{cases} 0, & n \equiv 0(4); \\ -1, & n \equiv 1(4); \\ i, & n \equiv 2(4); \\ 0, & n \equiv 3(4); \end{cases} \quad c_{-1}^n = \begin{cases} 0, & n \equiv 0(4); \\ 0, & n \equiv 1(4); \\ -i, & n \equiv 2(4); \\ -1, & n \equiv 3(4); \end{cases}$$

59. A method as recited in claim 53 wherein the intermediate form of the data is in the form of wavelet coefficients.

60. A method as recited in claim 53 wherein the initial form of the input digital data is Fourier coefficients, the intermediate form of the data is in the form of wavelet coefficients, and the output values at the points of the Farey quadrature are obtained via the use of a binary cascade of arrow structures arising from the calculation of wavelet coefficients as defined along a circle in the complex plane.

61. A method as recited in claim 60 further comprising the step of storing terminal arrow structures in order for restart or iterative refinement.

62. A method as recited in claim 59 wherein the wavelet coefficients are coefficients for arithmetic wavelets.

63. A method as recited in claim 59 wherein the wavelet coefficients are coefficients for modular wavelets.

64. A method as recited in claim 59 wherein the wavelet coefficients are coefficients for fan wavelets.

65. A method as recited in claim 59 wherein the input data is multi-dimensional.

* * * * *